(12) United States Patent
Curello et al.

(10) Patent No.: US 8,932,777 B2
(45) Date of Patent: Jan. 13, 2015

(54) FUEL SUPPLY SYSTEM WITH COMPRESSED GAS AND LIQUID FUEL CHAMBERS FOR FUEL CELLS

(75) Inventors: Andrew J. Curello, Hamden, CT (US); Paul Spahr, New Haven, CT (US)

(73) Assignee: Société BIC, Clichy Cedex (FR)

( * ) Notice: Subject to any disclaimer, the term of this patent is extended or adjusted under 35 U.S.C. 154(b) by 555 days.

(21) Appl. No.: 12/674,227

(22) PCT Filed: Aug. 21, 2008

(86) PCT No.: PCT/US2008/073865
§ 371 (c)(1),
(2), (4) Date: Feb. 19, 2010

(87) PCT Pub. No.: WO2009/026439
PCT Pub. Date: Feb. 26, 2009

(65) Prior Publication Data
US 2011/0189574 A1    Aug. 4, 2011

Related U.S. Application Data

(60) Provisional application No. 60/957,362, filed on Aug. 22, 2007, provisional application No. 61/016,508, filed on Dec. 24, 2007.

(51) Int. Cl.
| | |
|---|---|
| *H01M 8/04* | (2006.01) |
| *H01M 8/06* | (2006.01) |
| H01M 8/10 | (2006.01) |
| *C01B 3/06* | (2006.01) |

(52) U.S. Cl.
CPC ...... *H01M 8/04082* (2013.01); *H01M 8/04208* (2013.01); *H01M 8/1011* (2013.01); *C01B 3/06* (2013.01); *Y02E 60/523* (2013.01)
USPC ......... 429/447; 429/421; 429/443; 136/561 R

(58) Field of Classification Search
USPC ....... 429/408, 416, 447, 421, 443; 136/561 R
See application file for complete search history.

(56) References Cited

U.S. PATENT DOCUMENTS

| | | | |
|---|---|---|---|
| 465,013 A | 12/1891 | Bourdil | |
| 2,450,446 A | 10/1948 | Rupp | |

(Continued)

FOREIGN PATENT DOCUMENTS

| | | | |
|---|---|---|---|
| JP | 2004263801 A | | 9/2004 |
| JP | 2006221828 A | | 8/2006 |
| JP | 2008266037 A | * | 11/2008 |

OTHER PUBLICATIONS

Sugimoto, M., Machine translation of JP 2008-266037 A, Nov. 2008.*

(Continued)

*Primary Examiner* — Sean P Cullen
(74) *Attorney, Agent, or Firm* — The H.T. Than Law Group

(57) ABSTRACT

Disclosed herein is a fuel supply comprising a compressed gas chamber and liquid fuel chamber. A pressure regulator connects the compressed gas chamber to the liquid fuel chamber. The pressure regulator is capable of taking a high pressure input from the compressed gas chamber and providing a substantially constant lower output pressure to the liquid fuel chamber. The pressure of the compressed gas chamber can decrease over time, but the pressure that urges liquid fuel out of the liquid fuel chamber remains substantially at the same level.

20 Claims, 23 Drawing Sheets

(56) References Cited

U.S. PATENT DOCUMENTS

| | | | |
|---|---|---|---|
| 2,990,489 A | | 7/1961 | Peras |
| 3,010,279 A | * | 11/1961 | Mullen, II et al. .............. 60/218 |
| 3,544,382 A | * | 12/1970 | Wandschneider et al. .... 429/410 |
| 3,973,752 A | | 8/1976 | Boelkins |
| 4,726,390 A | | 2/1988 | Franklin |
| 4,997,111 A | | 3/1991 | Lowers |
| 5,293,902 A | | 3/1994 | Lapierie |
| 6,962,275 B2 | | 11/2005 | deCler et al. |
| 7,022,107 B1 | | 4/2006 | Christensen et al. |
| 7,883,815 B2 | | 2/2011 | Suda et al. |
| 2004/0072049 A1 | | 4/2004 | Becerra et al. |
| 2005/0022883 A1 | | 2/2005 | Adams et al. |
| 2005/0164065 A1 | | 7/2005 | An et al. |
| 2006/0174952 A1 | | 8/2006 | Curello et al. |
| 2006/0191198 A1 | | 8/2006 | Rosenzweig et al. |
| 2006/0202146 A1 | | 9/2006 | Doyle |
| 2008/0272128 A1 | | 11/2008 | Norimatsu et al. |

OTHER PUBLICATIONS

International Search Report and Written Opinion issued in connection with corresponding International Application No. PCT/US2008/073865 on Nov. 4, 2008.
International Search Report and Written Opinion issued in connection with corresponding International Application No. PCT/US2008/073868 on Nov. 21, 2008.
Translated Abstract for JP 2006221828 to Hara et al.
Machine translation of JP 2004263801 to Niimi et al.
Extended European Search Report issued in connection with the corresponding European Patent Application No. EP 08 79 8370 on Mar. 3, 2014.

* cited by examiner

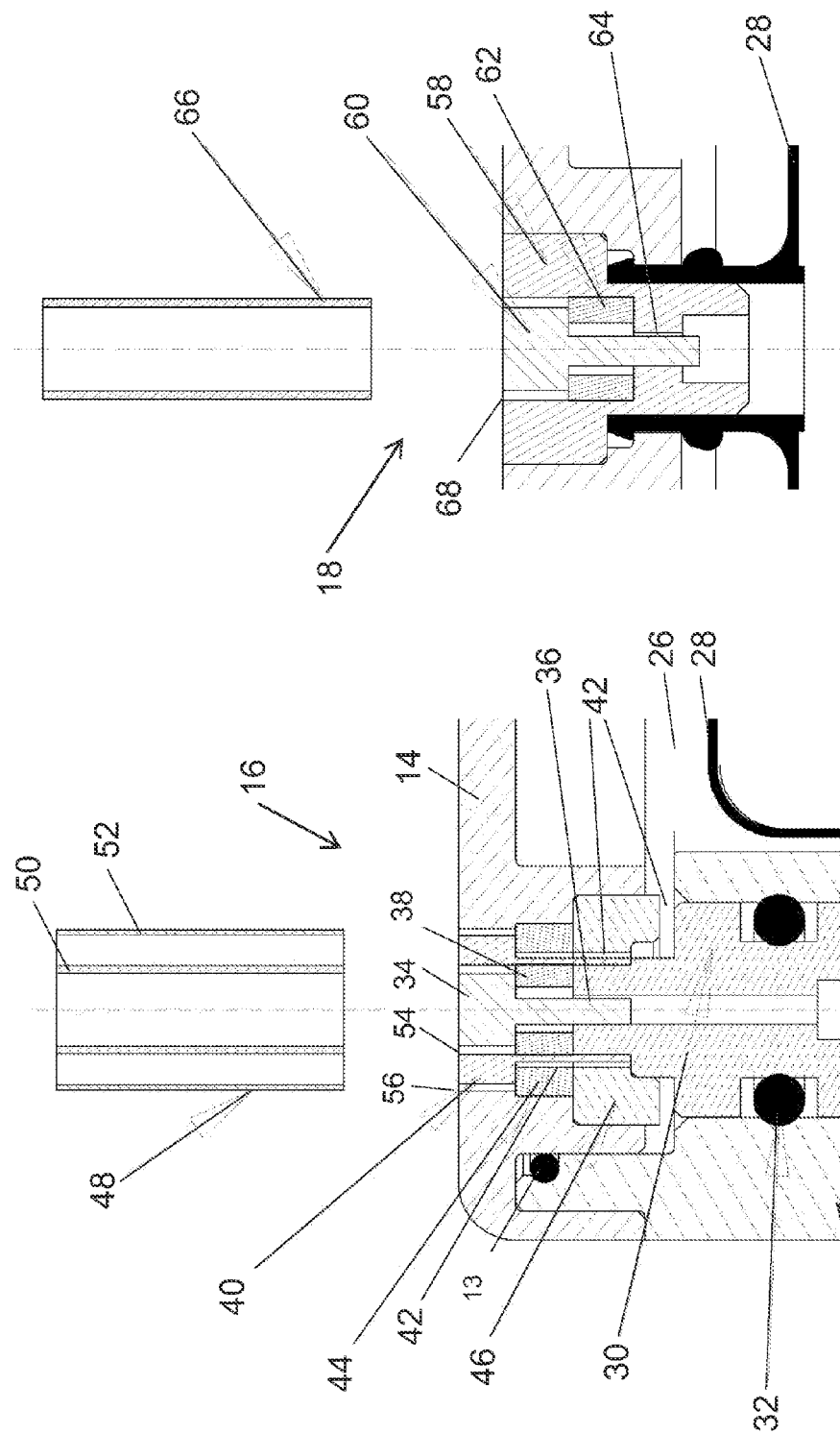

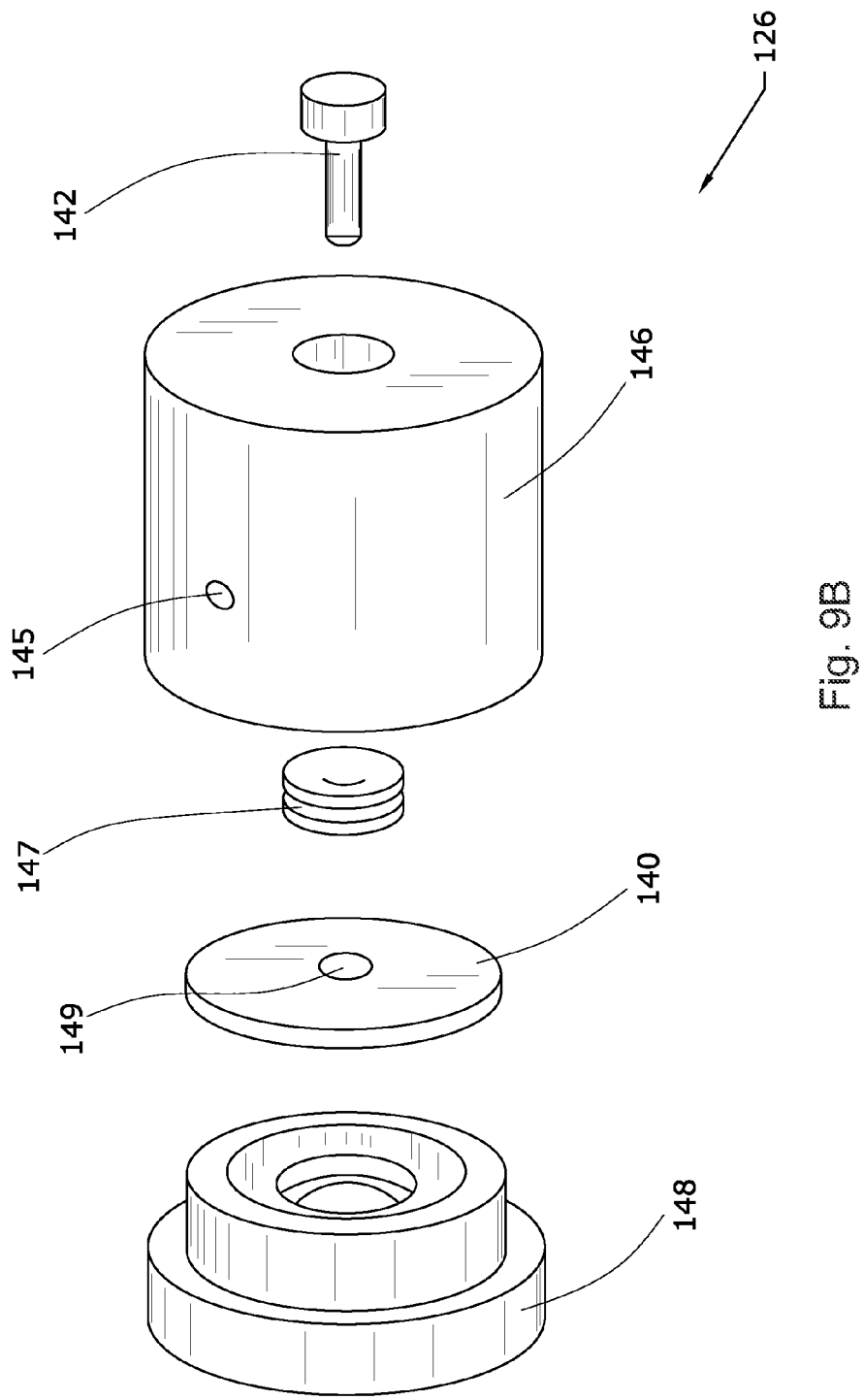

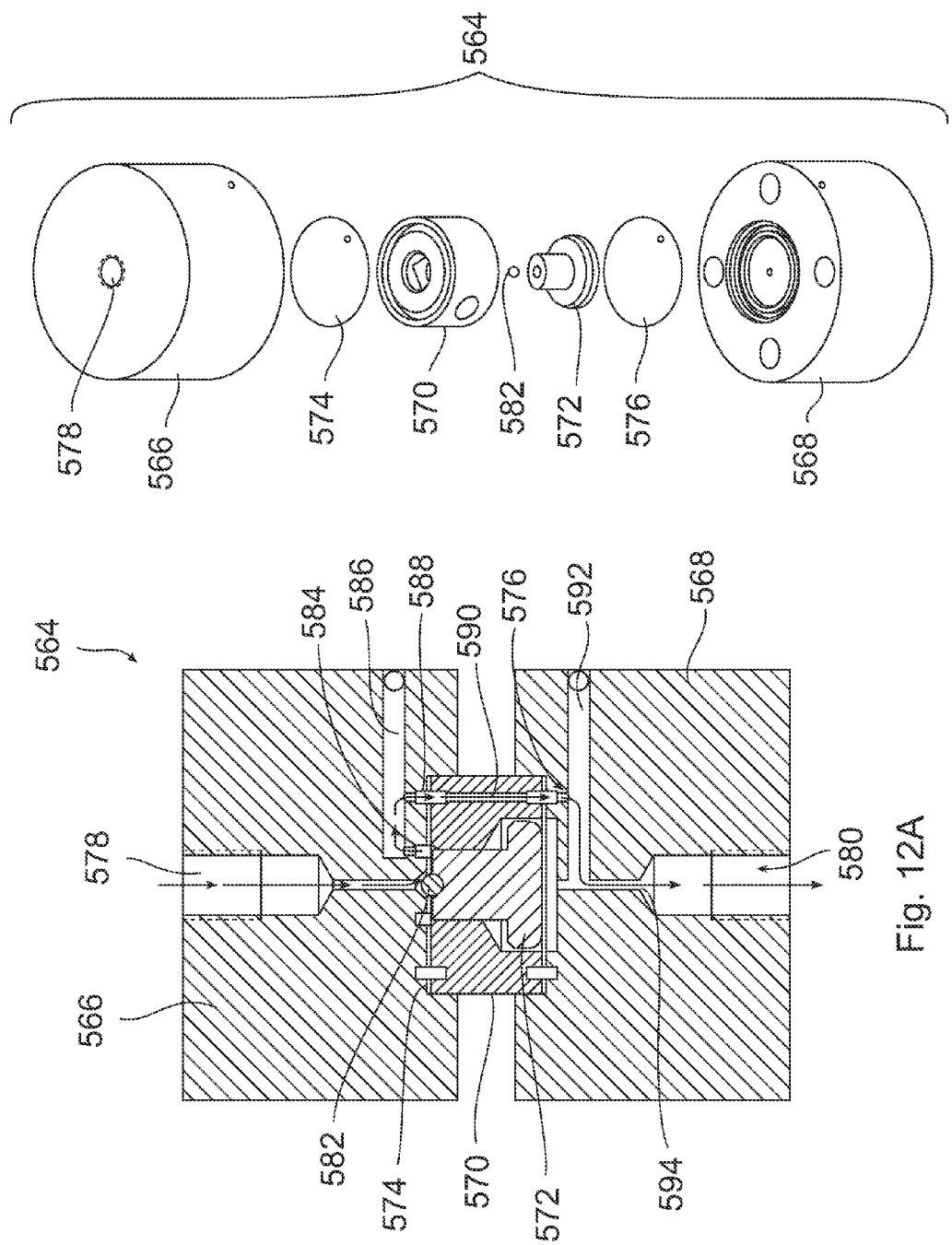

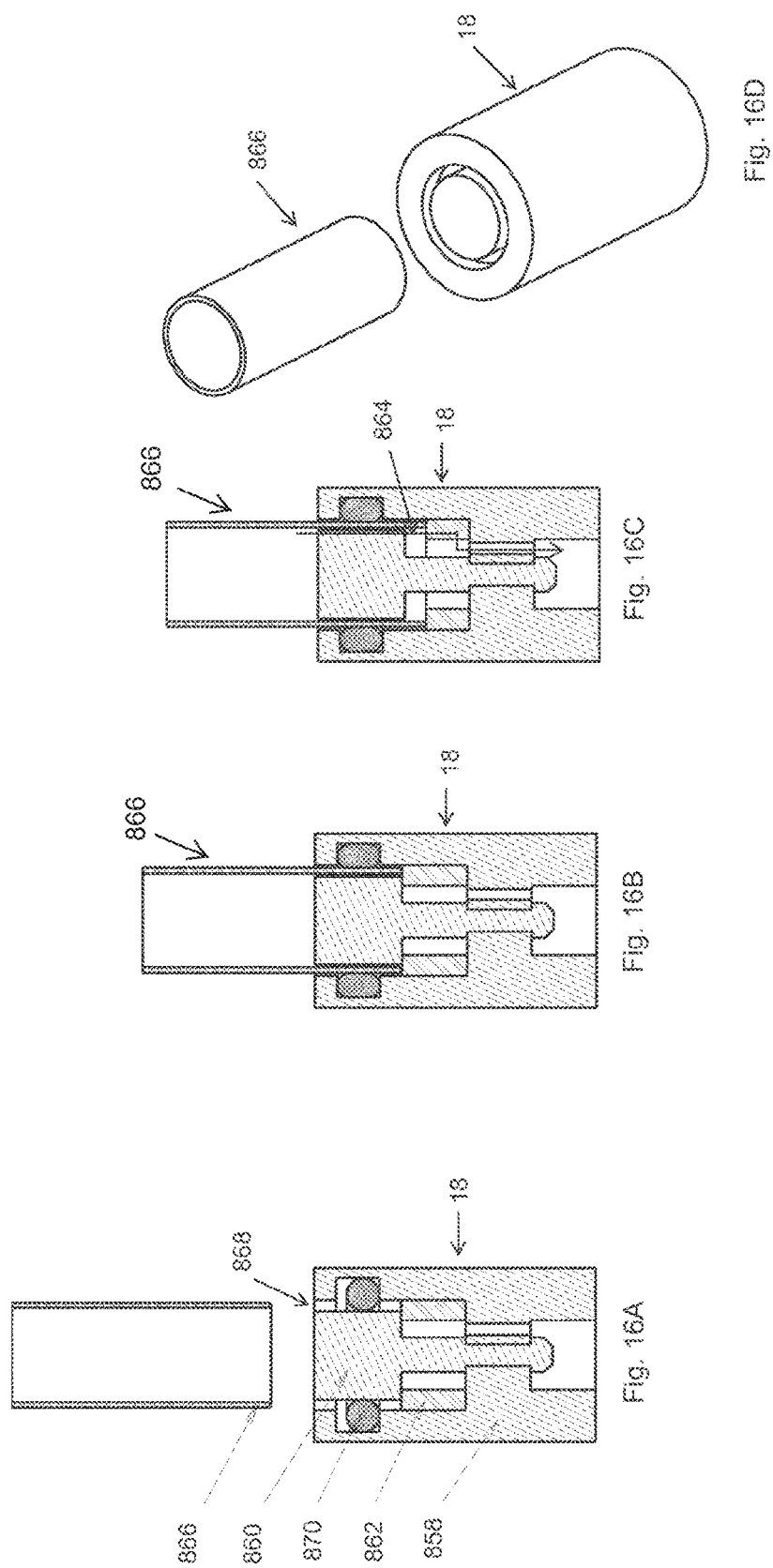

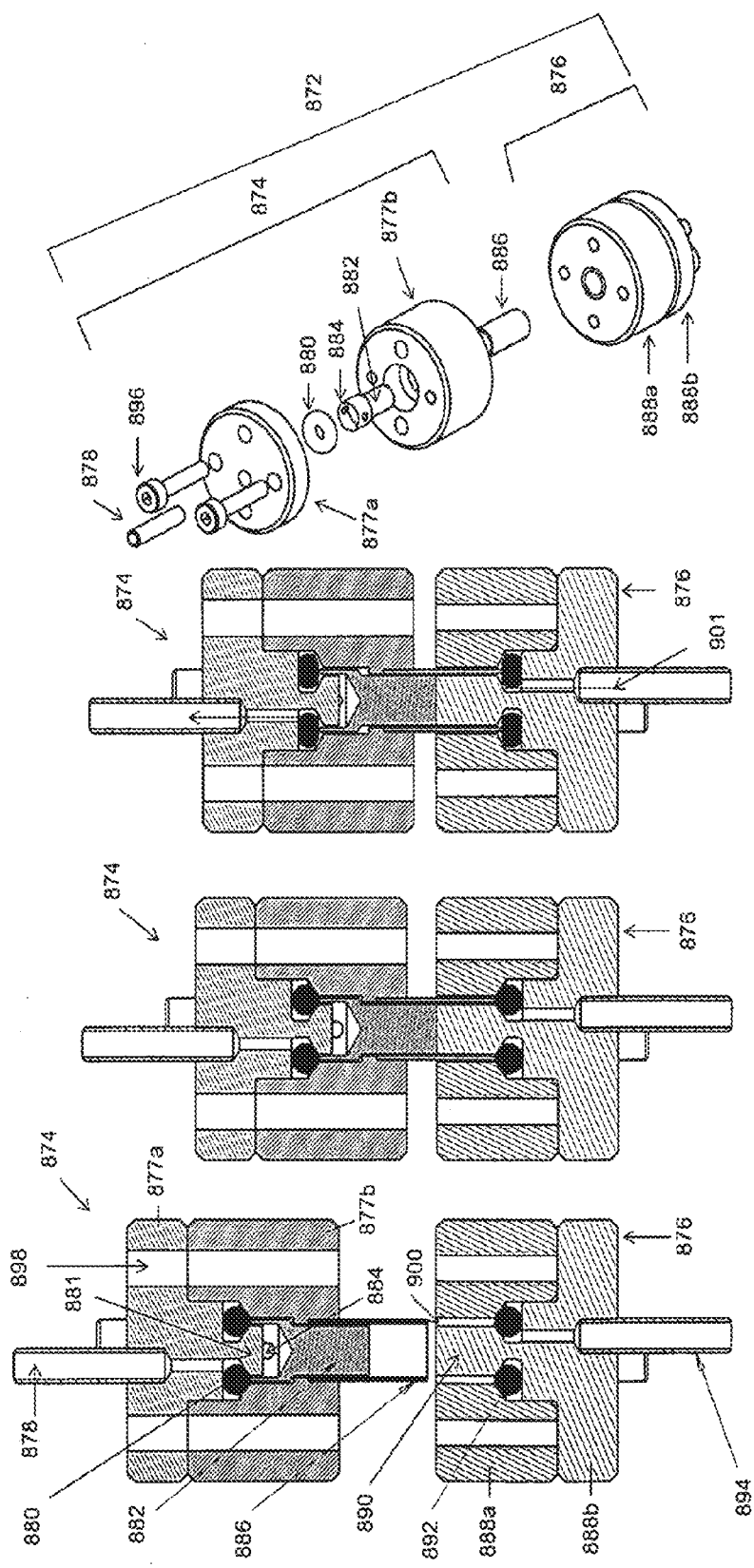

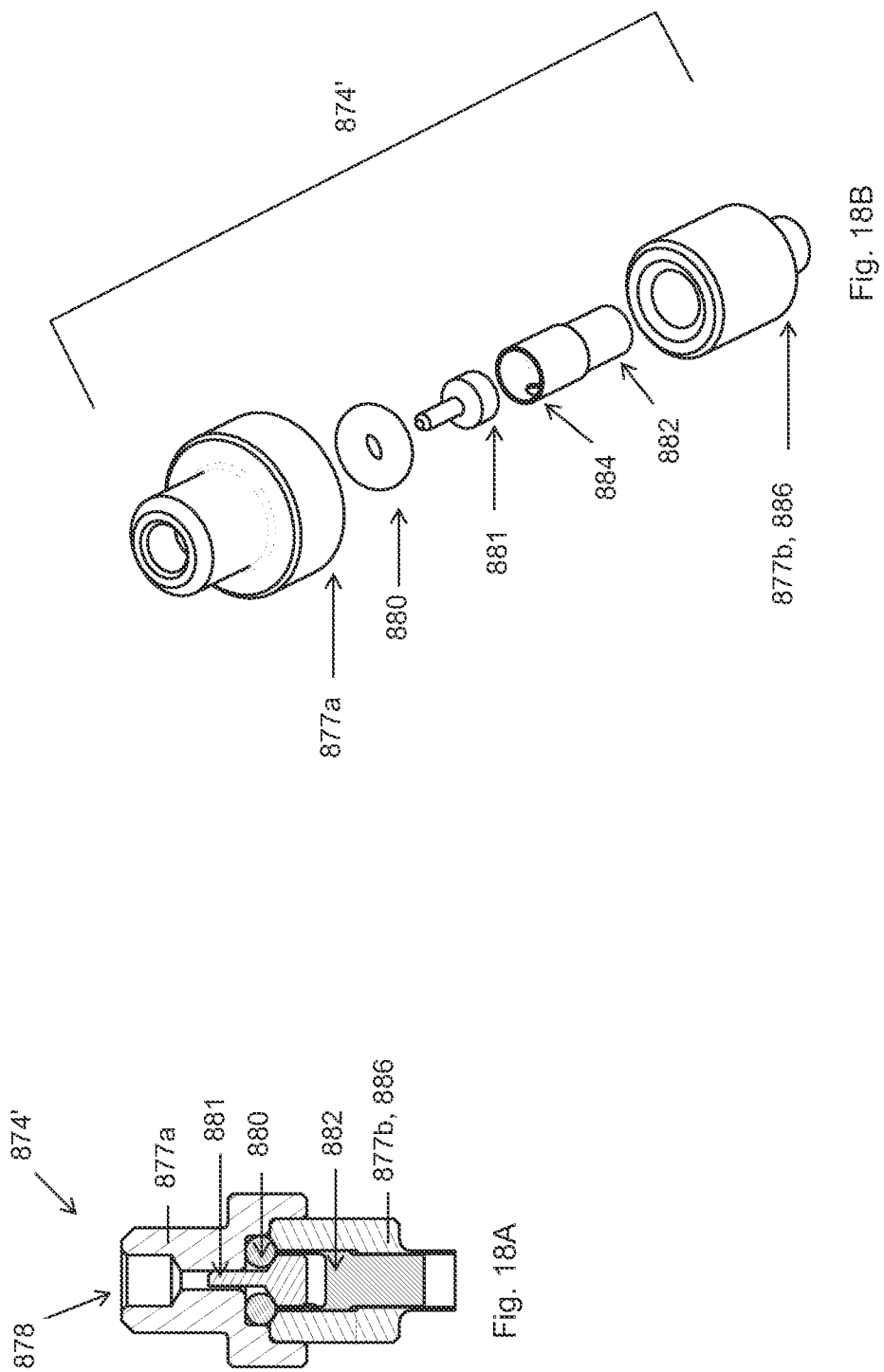

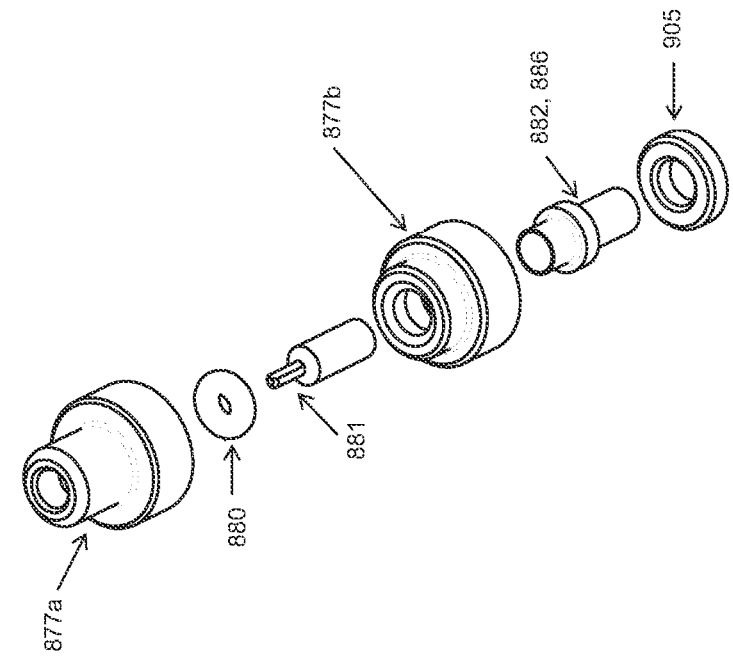
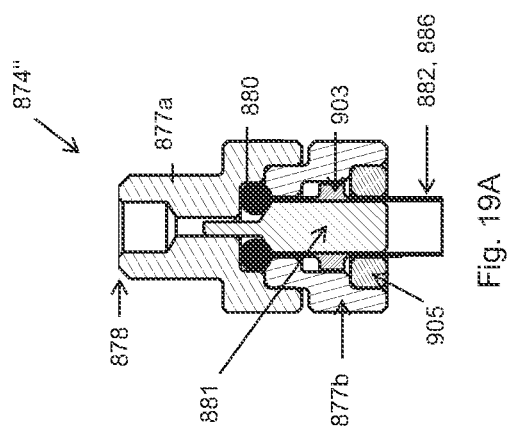
Fig. 19B
Fig. 19A

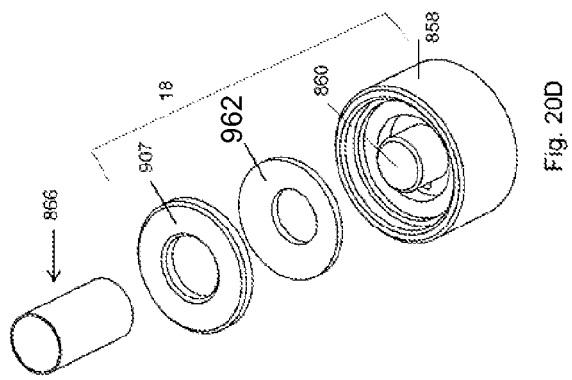
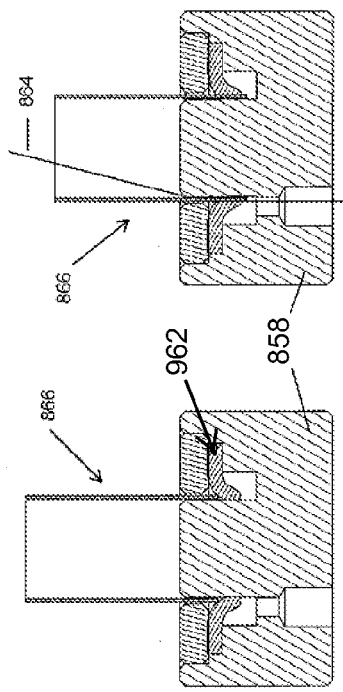
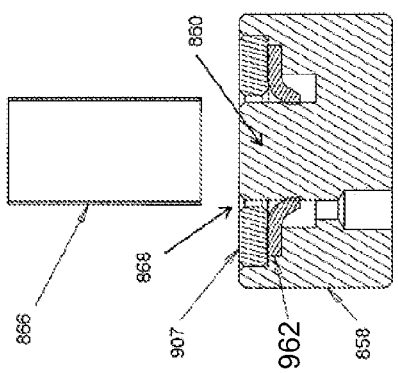

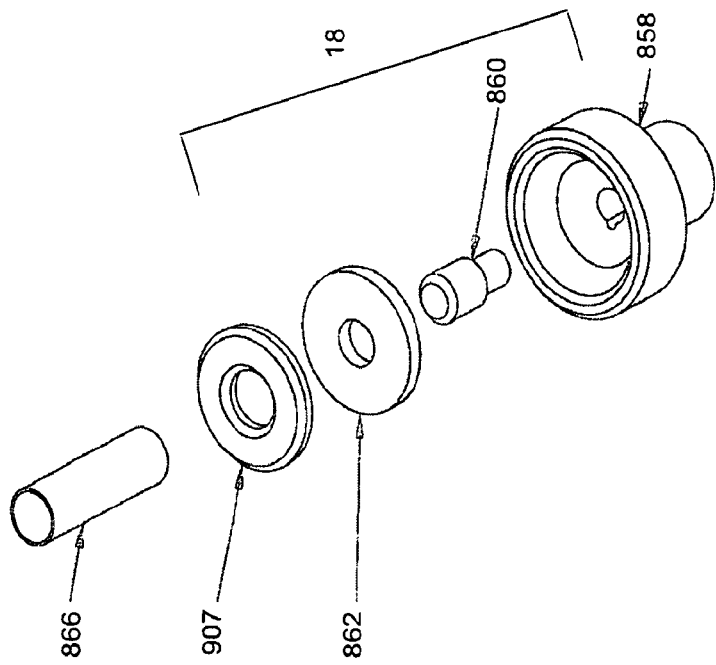
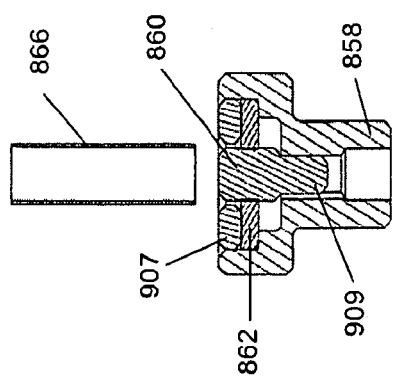
Fig. 21B
Fig. 21A

US 8,932,777 B2

FUEL SUPPLY SYSTEM WITH COMPRESSED GAS AND LIQUID FUEL CHAMBERS FOR FUEL CELLS

FIELD OF THE INVENTION

This invention generally relates to fuel cartridges for fuel cells, and more particularly this invention relates to pressurized fuel cell cartridges.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel; (ii) proton exchange membrane or polymer electrolyte membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

The chemical reactions that produce electricity are different for each type of fuel cell. For DMFC, the chemical-electrical reaction at each electrode and the overall reaction for a direct methanol fuel cell are described as follows:

$CH_3OH+H_2O \rightarrow CO_2+6H^++6e^-$     Half-reaction at the anode:

$1.5O_2+6H^++6e^- \rightarrow 3H_2O$     Half-reaction at the cathode:

$CH_3OH+1.5O_2 \rightarrow CO_2+2H_2O$     The overall fuel cell reaction:

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 4,390,603 and 4,828,941, which are incorporated by reference herein in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support, which is a carbon paper coated on one side with polytetrafluoroethylene (PTFE) (TEFLON® is a registered trademark of the E.I. DU PONT DE NEMOURS AND COMPANY Corporation) with a thin layer of catalyst, such as platinum-ruthenium, deposited thereon. The cathode is typically a gas diffusion electrode in which platinum particles are bonded to one side of the membrane.

In a chemical metal hydride fuel cell, sodium borohydride is reformed and reacts as follows:

$NaBH_4+2H_2O \rightarrow$ (heat and/or catalyst) $\rightarrow 4(H_2)+$ ($NaBO_2$)

$H_2 \rightarrow 2H^++2e^-$     Half-reaction at the anode:

$2(2H^++2e)+O_2 \rightarrow 2H_2O$     Half-reaction at the cathode:

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water by-product. Sodium borate ($NaBO_2$) by-product is also produced by the reforming process. A sodium borohydride fuel cell is discussed in U.S. Pat. No. 4,261,956, which is incorporated by reference herein in its entirety.

One of the more important features for fuel cell application is transportation of a liquid fuel from the fuel storage area to either the fuel cell, such as transporting methanol to a DMFC, or a liquid fuel reactant to a reaction chamber, such as transporting water and additives to react with a metal hydride. Known methods of transporting liquid fuel/reactant include wicking or capillary action, pressurizing the liquid fuel/reactant. Among the challenges encountered with these methods include controlling the flow rate with wicking fuel and maintaining a steady pressure on the fuel with pressurized source.

Hence, there remains a need in the art for improved methods of transporting liquid fuel/reactant.

SUMMARY OF THE INVENTION

The present invention provides a fuel supply with a pressurized source to urge the liquid fuel or liquid fuel reactant (hereinafter collectively referred to as "liquid fuel") to a fuel cell or to a reaction chamber that hydrolyses the liquid fuel reactant to produce hydrogen. This pressurized source is initially at a high pressure and its pressure may decrease over the expected life of the fuel supply. On the other hand, the pressure that urges the liquid fuel can be maintained at a substantially constant level.

In one embodiment, the inventive fuel supply comprises a compressed gas chamber and liquid fuel chamber. A pressure regulator connects the compressed gas chamber to the liquid fuel chamber. The pressure regulator is capable of taking a high pressure input from the compressed gas chamber and provides a substantially constant lower output pressure to the liquid fuel chamber. The pressure of the compressed gas chamber can decrease over time, but the pressure that urges liquid fuel out of the liquid fuel chamber remains substantially at the same level. Hence, the fuel cell or reaction chamber receives the liquid fuel at a predictable or acceptable pressure.

BRIEF DESCRIPTION OF THE DRAWINGS

In the accompanying drawings, which form a part of the specification and are to be read in conjunction therewith and in which like reference numerals are used to indicate like parts in the various views:

FIG. 5 is an enlarged partial view of the fuel supply of FIG. 4 showing the valve connecting the pressurized chamber of the fuel supply to the pressure regulator;

FIG. 6 is an enlarged partial view of the fuel supply of FIG. 4 showing the valve connecting the fuel supply to the fuel cell or the device that the fuel cell powers;

FIG. 9A is a cross-sectional view and FIG. 9B is an exploded view of a suitable pressure regulator;

FIG. 12A is a cross-sectional view and FIG. 12B is an exploded view of another suitable pressure regulator.

FIGS. 16a-16c are cross-sectional views of another exemplary valve according to the present invention showing the opening sequence from closed in FIG. 16a to engaged and closed in FIG. 16b to open in FIG. 16c, and FIG. 16d is an exploded perspective view of the valve;

FIGS. 17a-17c are cross-sectional views of another exemplary valve according to the present invention showing the opening sequence from closed in FIG. 17a to engaged and closed in FIG. 17b to open in FIG. 17c, and FIG. 17d is an exploded perspective view of the valve;

FIG. 18a is a cross-sectional view of an exemplary valve component according to the present invention, and FIG. 18b is an exploded perspective view of the valve component;

FIG. 19a is a cross-sectional view of another exemplary valve component according to the present invention, and FIG. 19b is an exploded perspective view of the valve component;

FIGS. 20a-20c are cross-sectional views of another exemplary valve showing the opening sequence of the valve and FIG. 20d is an exploded perspective view of the valve; and FIG. 21a is an exploded cross-sectional view of another exemplary valve and FIG. 21b is an exploded view of the valve.

DETAILED DESCRIPTION OF THE INVENTION

Figure 1:
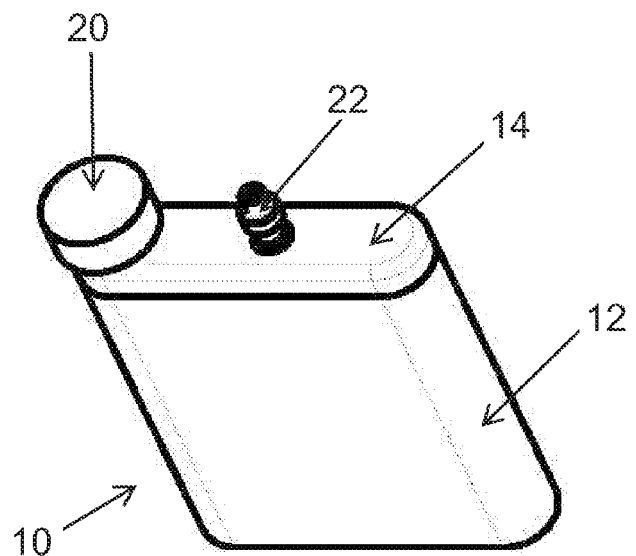
FIG. 1 is a front perspective view of a fuel supply in accordance with the present invention showing components from a fuel cell or a device that the fuel cell powers.
Figure 2:
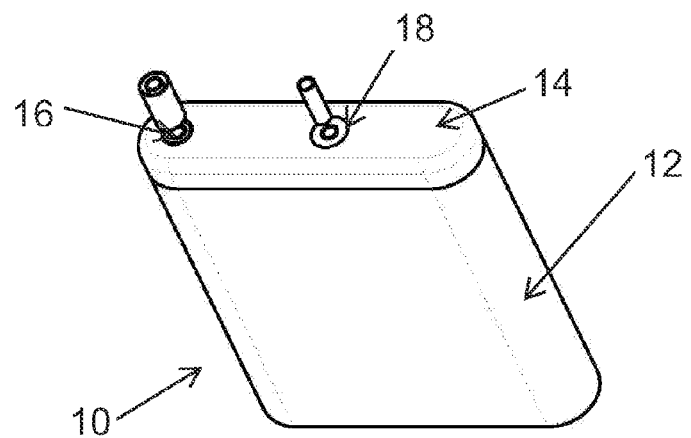
FIG. 2 is a front perspective view of the fuel supply of FIG. 1 without the device side components but with connecting tubes adapted to open the fuel supply's valves.

As illustrated in the accompanying drawings and discussed in detail below, the present invention is directed to a fuel supply, which stores fuel cell fuels, such as methanol and water, methanol/water mixture, methanol/water mixtures of varying concentrations, pure methanol, and/or methyl clathrates described in U.S. Pat. Nos. 5,364,977 and 6,512,005 B2, which are incorporated by reference herein in their entirety. Methanol and other alcohols are usable in many types of fuel cells, e.g., DMFC, enzyme fuel cells and reformat fuel cells, among others. The fuel supply may contain other types of fuel cell fuels, such as ethanol or alcohols; metal hydrides, such as sodium borohydrides; other chemicals that can be reformatted into hydrogen; or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in U.S. Pat. App. Pub. No. US 2003/0077493, entitled "Method of Using Fuel Cell System Configured to Provide Power to One or More Loads," published on Apr. 24, 2003, which is incorporated by reference herein in its entirety. Fuels can also include a mixture of methanol, hydrogen peroxide and sulfuric acid, which flows past a catalyst formed on silicon chips to create a fuel cell reaction. Moreover, fuels include a blend or mixture of methanol, sodium borohydride, an electrolyte, and other compounds, such as those described in U.S. Pat. Nos. 6,554,877, 6,562,497 and 6,758,871, which are incorporated by reference herein in their entireties. Furthermore, fuels include those compositions that are partially dissolved in a solvent and partially suspended in a solvent, described in U.S. Pat. No. 6,773,470 and those compositions that include both liquid fuel and solid fuels, described in U.S. Pat. Appl. Pub. No. US 2002/0076602. Suitable fuels are also disclosed in co-owned, co-pending U.S. Pat. Appl. No. 60/689,572, entitled "Fuels for Hydrogen-Generating Cartridges," filed on Jun. 13, 2005. These references are also incorporated by reference herein in their entireties.

Fuels can also include a metal hydride such as sodium borohydride ($NaBH_4$) and an activator, such as water, discussed above. Fuels can further include hydrocarbon fuels, which include, but are not limited to, butane, kerosene, alcohol, and natural gas, as set forth in U.S. Pat. Appl. Pub. No. US 2003/0096150, entitled "Liquid Hereto-Interface Fuel Cell Device," published on May 22, 2003, which is incorporated by reference herein in its entirety. Fuels can also include liquid oxidants that react with fuels. The present invention is therefore not limited to any type of fuels, activators, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gaseous, liquids, solids, and/or chemicals including additives and catalysts and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply of the present invention can also be used to store fuels that are not used in fuel cells. These applications can include, but are not limited to, storing hydrocarbons and hydrogen fuels for micro gas-turbine engines built on silicon chips, discussed in "Here Come the Microengines," published in The Industrial Physicist (December 2001/January 2002) at pp. 20-25. As used in the present application, the term "fuel cell" can also include microengines. Other applications can include storing traditional fuels for internal combustion engines and hydrocarbons, such as butane for pocket and utility lighters and liquid propane.

Referring to FIGS. 1-4, fuel supply 10 is shown. Fuel supply 10 can have any convenient shape, including but not limited to the shape shown. Fuel supply 10 has outer casing 12, lid 14, first valve 16, and second valve 18. Lid 14 is fitted to outer casing 12, and is sealed thereto by O-ring 13. Sealing can also be accomplished by adhesives or ultrasonic welding. First valve 16 is sized and dimensioned to mate with a pressure regulator 20 and second valve 18 is sized and dimensioned to mate with device valve 22. In one embodiment, fuel supply 10 is disposable and more preferably recyclable. More particularly, outer casing 12 is recyclable or reusable, and inner liner 28 and/or lid 14 are disposable. Pressure regulator 20 and device valve 22 are preferably reusable, and are connected to or are parts of the fuel cell or the device that the fuel cell powers to save costs.

Figure 3:
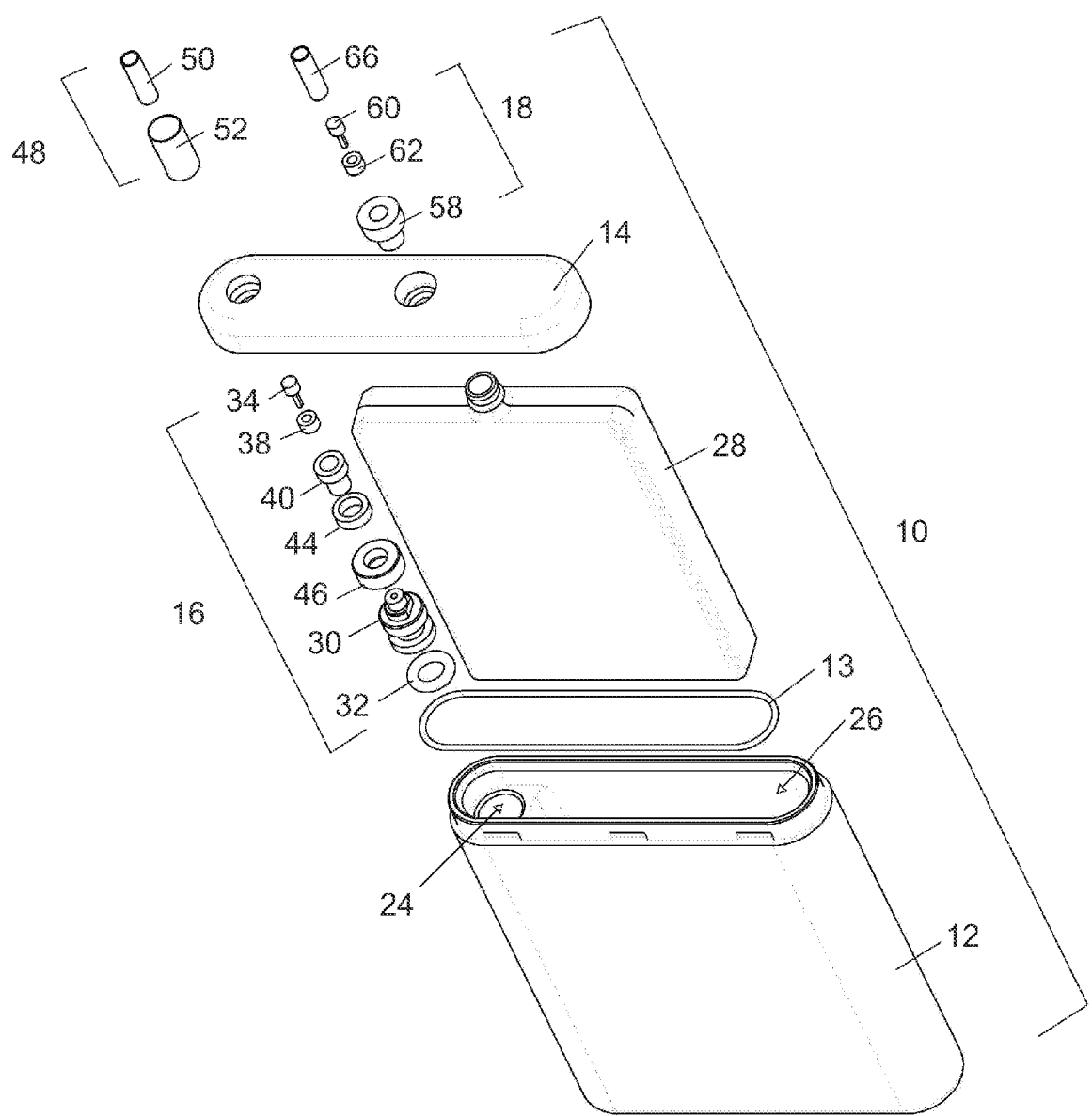
FIG. 3 is an exploded perspective view of the fuel supply of FIG. 2.
Figure 4:
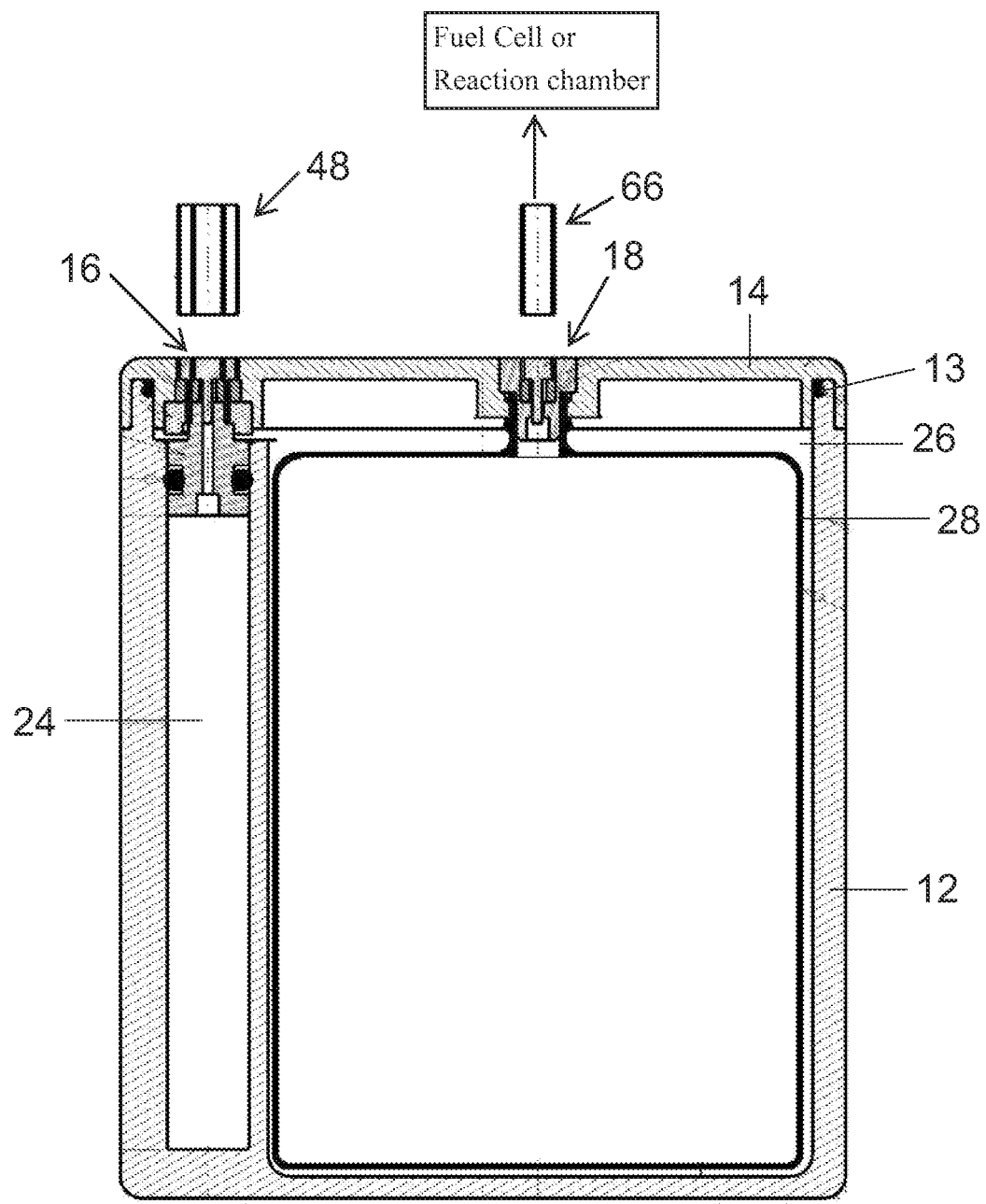
FIG. 4 is a cross-sectional and partial exploded view of the fuel supply of FIG. 2.

Referring to FIGS. 3-5, where the internal components are shown in detail, fuel supply 10 has compressed gas chamber 24 and liquid fuel chamber 26, where liquid fuel is kept inside liner 28. As discussed above, liquid fuel can be a fuel that is used directly by a fuel cell, such as methanol and ethanol. Liquid fuel can also be a liquid reactant that hydrolyzes in a reaction chamber to produce hydrogen that powers the fuel cell, such as water or other activators to react with solid metal hydride to form hydrogen fuel.

First valve 16 allows compressed gas to exit pressurized or compressed gas chamber 24 of fuel supply 10 to enter pressure regulator 20, and then communicate the reduced pressure gas back into fuel supply 10 and to liquid fuel chamber 26 to apply pressure on liner 28. First valve 16 comprises valve body 30, which is fitted to the side walls of compressed gas chamber 24 and is sealed thereto with O-ring 32. Inner center post 34 is fixedly attached to valve body 30, e.g., interference fit, so that there is substantially no relative movement between inner center post 34 and valve body 30. A flow channel 36, which is an inner flow channel, is defined between the stem of inner center post 34 and valve body 30. In one example, the stem has a cylindrical shape and a portion of stem is filed down to form a flat surface. Inner flow channel 36 is formed between the flat surface and valve body 30, as best shown in FIGS. 3 and 5. Inner elastomeric seal 38 is disposed between the head of inner center post 34 and the top of valve body 30, as shown, to provide a seal for inner flow channel 36. First valve 16 also has outer center post 40, which is disposed annularly around inner center post 34, leaving a space therebetween as shown. Outer center post 40 is also fixedly attached to valve body 30, e.g., interference fit, so that there is substantially no relative movement between outer center post 40 and valve body 30. Outer flow channel 42 is defined around the outside of outer center post 40 to allow the reduced pressure gas from pressure regulator 20 to re-enter fuel supply 10. Within fuel supply 10 outer flow channel 42 is re-directed to liquid fuel chamber 26, as best shown in FIG. 5. Outer elastomeric seal 44 provides a seal for outer flow channel 42 and is positioned below the head of outer center post 40 and optional cap 46. Cap 46 can be omitted and valve body 30 can be extended upward to meet outer elastomeric seal 44, or outer elastomeric seal 44 can be extended downward to meet valve body 30.

While inner flow channel 36 is shown to be inside of outer flow channel 42, these two flow channels can be arranged in the reverse order, or side-by-side. Consequently, inner flow channel 36 may be referred to generally as a first flow channel and outer flow channel 42 may be referred to generally as a second flow channel, or vice versa. Likewise, inner elastomeric seal 38 may be referred to generally as a first sealing member and outer elastomeric seal 44 may be referred to generally as a second sealing member, or vice versa.

As shown in FIGS. 3 and 5, first valve 16 is closed or sealed. To open first valve 16, tube 48 is pushed into first valve 16. Tube 48 comprises inner tube 50 and outer tube 52. These tubes can be connected to each other to maintain their relative positions, for example by spokes or webs (not shown). Inner tube 50 is sized and dimensioned to fit in space 54 between inner center post 34 and outer center post 40, and outer tube 52 is sized and dimensioned to fit in space 56 between outer center post 40 and lid 14. Inner tube 50 compresses inner elastomeric seal 38, which is located in a lower portion of space 54, to open a flow path, namely, inner flow channel 36, and outer tube 52 compresses outer elastomeric seal 44, which is located in a lower portion of space 56, to open a flow path, namely, outer flow channel 42. Compressed gas exits fuel supply 10 through flow path 36 and reduced pressure gas re-enters fuel supply through flow path 42 to pressurize liquid fuel.

In an innovative aspect of the present invention, because first valve 16 comprises center posts 34, 40, it is not interchangeable. In particular, valve 16 opens only after a tube 48 with the correct diameter is inserted in the annular space around center posts 34, 40 to compress elastomeric seals 38, 44. Center posts 34, 40 are designed to prevent larger or smaller diameter foreign objects (e.g., pens, pencils, paper clips, fingers, and the like) from opening the valve. Center posts 34 and 40 may be attached to valve body 30 by various methods, such as snap fitting, adhesive, ultrasonic welding, etc., so long as relative motions between the posts and the valve body are limited. Preferably, center posts 34, 40 can be assembled after or during the filling operation. Consequently, the flow of fuel into the cartridge will be faster and less restricted than in other designs.

Second valve 18 is similar to first valve 16, except that it is only configured to allow liquid fuel to exit fuel supply 10. Second valve 18 comprises valve body 58 and center post 60, which is substantially similar to inner center post 34 of first valve 16, described above. Elastomeric seal 62 seals second valve 18 and flow channel 64 is defined between center post 60 and valve body 58. Liner 28 is sealingly connected to valve body 58. Tube 66 is sized and dimensioned to enter space 68 in second valve 18 to compress elastomeric seal 62 to open second valve 18 to let the liquid fuel urged by pressurized gas from outer flow channel 42 to leave fuel supply 10.

Optionally, tubes 48 or 66 have non-standard sizes. In other words, their dimensions are different than the dimensions of items commonly found in homes or offices, so that it is more difficult to unintentionally compress elastomeric seals 38, 44 or 62, which are sealing members. Alternatively, tubes 48 or 66 should have non-circular or polygonal (regular or irregular) cross-sections. Of course, center posts 34, 40 or 60 should have matching shapes in order to receive the tubes.

Figure 8:
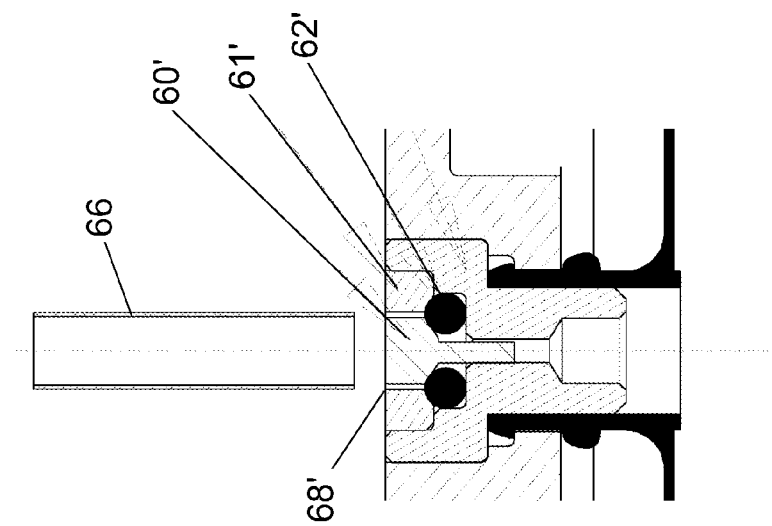
FIGS. 7 and 8 show an alternative embodiment of the valves of FIGS. 5 and 6.
Figure 7:
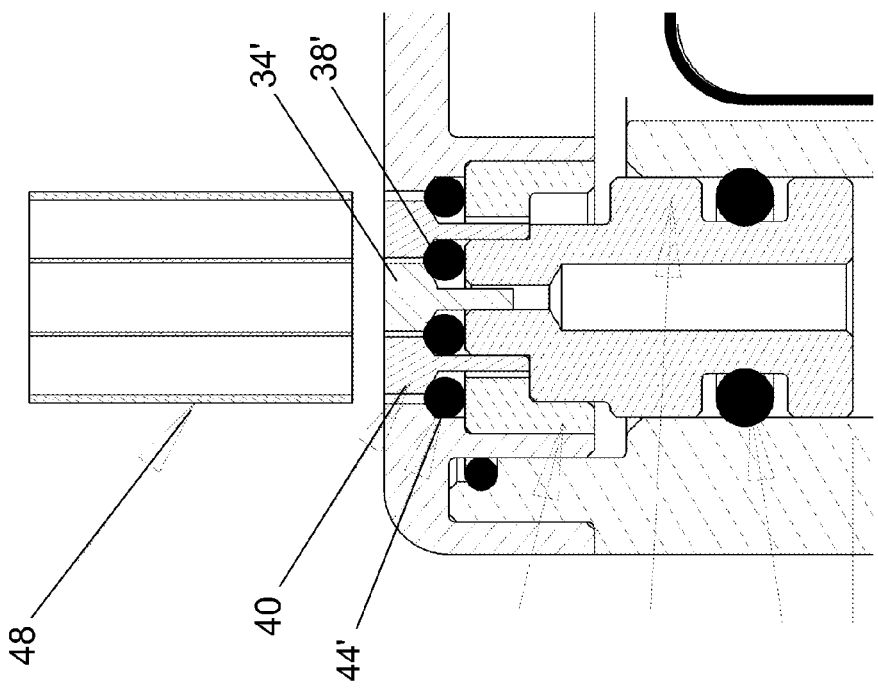

In an alternative embodiment shown in FIGS. 7-8, elastomeric seals 38, 44 and 62 are replaced by O-rings 38', 44' and 62'. Center posts 34' and 40' are modified to provide angular seating surfaces to seal with the O-rings. Center post 60' in this embodiment has outer ring 61' to provide spacing 68' for tube 66 to enter to open second valve 18.

As illustrated in FIGS. 5-8 as well as other drawings, the top surface of valves 16 and 18 facing tubes 48 and 66 can also be termed the mating surface.

The high pressure of compressed gas chamber 24 necessary to push liquid fuel throughout the expected life of fuel supply 10 can be determined by the ideal gas law, as shown below:

$$((P \cdot V/T)_{24} + (P \cdot V/T)_{26})_{initial} = ((P \cdot V/T)_{24} + (P \cdot V/T)_{26})_{final}$$

where for liquid fuel chamber 26,
P=the pressure necessary to urge liquid fuel out of liner 28/fuel chamber 26 through second valve 18, where in one example can be "x" psi gauge ($psi_g$) or (14.7+x) psi absolute ($psi_a$) and x is the desired urging pressure; initial pressure for fuel chamber 26 should be 14.7 $psi_a$ or 0 $psi_g$; final pressure for fuel chamber 26 should be (14.7+x) $psi_a$ or x $psi_g$
V=the volume of liquid fuel chamber 26;
T=the temperature (absolute) of liquid fuel chamber 26, which typically is ambient temperature.
where for the compressed gas chamber 24,
P=initial pressure—to be determined; final pressure for compressed gas chamber 24 should be x $psi_g$ or (14.7+x) $psi_a$
V=the volume of compressed gas chamber 24; and
T=also typically ambient temperature.
Since the two temperatures should be the same, they can be eliminated from the equation.

$$(P \cdot V)_{24,initial} + (P \cdot V)_{26,initial} = (P \cdot V)_{24,final} + (P \cdot V)_{26,final}$$

$$P_{24,initial} = \frac{(P \cdot V)_{24,final} + (P \cdot V)_{26,final} - (P \cdot V)_{26,initial}}{V_{24}}$$

In one example, if liquid fuel chamber 26 having a volume of 50 cc needs a pressure of 2 $psi_g$ or 16.7 $psi_a$ for the fuel to be pushed out of second valve 18, and the volume of compressed gas chamber 24 is 5 cc, then the initial pressure of compressed gas chamber 24 is calculated as follows:

$$P_{24,initial} = \frac{(16.7 \cdot 5) + (16.7 \cdot 50) - (14.7 \cdot 50)}{5}$$

$$P_{24,initial} = 36.7 \; psi_a \; (\text{or } 22 \; psi_g)$$

Similarly, if the volume of compressed gas chamber 24 has a volume of 10 cc, then its initial internal pressure can be 26.7 $psi_a$ or 12 $psi_g$.

If this high initial internal pressure is directly communicated to liquid fuel chamber 26, then liner 28 would see a spike in pressure and the liquid fuel would leave fuel supply 10 at a relatively high velocity, which may be undesirable. Furthermore, as more liquid fuel is transported out of fuel supply 10, the pressure in liquid fuel chamber 26 would decrease continually over time and the liquid fuel would leave fuel supply 10 at continually decreasing velocity. The fuel cell or the reaction chamber that receives the liquid fuel then has to accommodate for the varying liquid fuel velocity.

The varying liquid fuel velocity is resolved by interjecting a pressure regulator, shown schematically at reference number 20 in FIG. 1, between compressed gas chamber 24 and liquid fuel chamber 26. Pressure regulator 20 can take an inlet pressure at a wide range, e.g., 2 $psi_g$ gauge to 200 $psi_g$, and control the outlet pressure at a constant level, e.g., 2 $psi_g$.

Referring to FIGS. 3-4, compressed gas chamber 24 is located within fuel supply 10; however, compressed gas chamber 24 can be located in the fuel cell or the device that the fuel cell powers, or can be its own separate cartridge.

Table 1 below presents the results of an experimental simulation of fuel supply 10, shown in FIGS. 1-8, wherein a pressure regulator 20 was interjected between a compressed gas chamber 24 and a liquid fuel chamber 26. The experimental simulation was conducted as follows. A compressed gas chamber 24, in the form of a 3.2 cm³ capacity modified syringe, was pressurized with about 80 psi air fed from an external supply via a tubing, wherein flow was regulated by a ball valve. The tubing was also used for the flow of gas from compressed gas chamber 24 to pressure regulator 20. A 0-100 psi pressure sensor, situated between the compressed gas chamber 24 and pressure regulator 20, was used to measure this high pressure input.

The pressure regulator 20 was used to produce a substantially constant low output pressure that urged liquid fuel, i.e. deionized water, from a liquid fuel chamber 26, which was in the form of a 35 cm³ capacity modified syringe. A modified tee fitting interconnected the pressure regulator 20 and liquid fuel chamber 26. The pressure regulator 20 and liquid fuel chamber, as fluidly connected, were placed on a Mettler Toledo XS204 analytical balance, which measured the weight of the liquid fuel, i.e., deionized water. The liquid fuel exited the liquid fuel chamber 26 via a tubing that fed the liquid fuel to a fluid collection beaker, wherein said tubing comprised at its end a 0.45 µm filter (a Millex-HPF HV Filter, part # SLHVM25NS, commercially available from Millipore Corporation of Billerica, Mass.) and 0.0025" diameter orifice (part IBLP-2E-SS, commercially available from O'Keffe Controls Co. of Trumbull, Conn.). A 0-30 psi pressure sensor, situated between the liquid fuel chamber 26 and fluid collection beaker, measured the fluid pressure, which a person having ordinary skill in the art would readily understand is equivalent to the output pressure.

Initially, in the experimental simulation, the regulated output pressure purged air out of the tubing lines and stabilized around 1.6 psi. Subsequently, ball valve was closed to isolate the external 80 psi air supply from compressed gas chamber 24. During the experimental simulation, input pressure, output pressure, and fuel weight (i.e., the weight of water in the modified syringe liquid fuel chamber 26) were measured. The measurements were taken every 0.5 second over a period of 215 minutes (12,902.5 seconds). However, for purposes of clarity, the results in Table 1 only display measurements at selected times: 0 s (when liquid fuel chamber 26 contained no fuel and the analytical balance had been zeroed), 0.5 s (when the liquid fuel chamber 26 was filed with deionized water), 55 s (when compressed gas chamber 24 was pressurized with about 80 psi air), at each 300 s time interval, and at 12,902.5 s (when no more fuel remained in the liquid fuel chamber 26). The fuel weight data has been adjusted by +1.2256 grams during the period between zeroing the analytical balance and the beginning of the simulation test, when the tubing that supported the load shifted. The minor negative weight values near the end of the simulation test reflect error inherent in the analytical balance.

The results demonstrate that a pressure regulator 20 is capable of taking a high pressure input, about 80 psi, from the compressed gas chamber 24 and providing a substantially constant lower output pressure, between about 1.6 psi and about 0.3 psi, to urge liquid out of liquid fuel chamber 26, which initially was filled with about 30 grams of deionized water. The pressure of the compressed gas chamber 24 can decrease over time, from about 80 psi to about 12 psi, but the pressure that urges liquid fuel out of the liquid fuel chamber 26 remains substantially at the same level, between about 1.6 psi and about 0.3 psi. A person of ordinary skill in the art would readily understand that the relatively minor variation of output pressure is within an acceptable range, allowing the fuel cell or reaction chamber to receive the liquid fuel at a predictable pressure that is acceptable to the operation of the fuel cell or the reaction chamber. As the liquid fuel exits the liquid fuel chamber 26 at a relatively constant flow rate, it decreases in weight from about 30 grams to about 0 grams.

As used herein the term "substantially constant" means pressure fluctuations, if any, are less than about ±2.0 psi, preferably less than about ±1.5 psi, and more preferably less than about ±1.0 psi. As used herein the terms "low pressure" or "lower pressure" mean a pressure less than or equal to about 5 psi, preferably a pressure less than or equal to about 3 psi, and more preferably a pressure less than or equal to about 2 psi.

TABLE 1

| Elapsed Time (seconds) | Input Pressure (psi) | Output Pressure (psi) | Weight of Fuel (grams) |
| --- | --- | --- | --- |
| 0 | 0.324175 | 0 | 0 |
| 0.5 | 0.289389 | 0 | 33.6665 |
| 55 | 81.09705 | 0.70702 | 31.8907 |
| 300 | 78.52603 | 1.541651 | 30.0016 |
| 600 | 73.49667 | 1.435592 | 27.8025 |
| 900 | 68.84618 | 1.33488 | 25.7307 |
| 1200 | 64.65367 | 1.268036 | 23.7769 |
| 1500 | 60.56975 | 1.174454 | 21.8294 |
| 1800 | 56.79189 | 1.09335 | 19.969 |
| 2100 | 53.28629 | 1.038092 | 18.2135 |
| 2400 | 49.8493 | 0.977542 | 16.5611 |
| 2700 | 46.58507 | 0.902915 | 15.0114 |
| 3000 | 43.66301 | 0.837617 | 13.5383 |
| 3300 | 41.07182 | 0.769987 | 12.1614 |
| 3600 | 38.48951 | 0.717515 | 10.8839 |
| 3900 | 35.91159 | 0.709353 | 9.7736 |
| 4200 | 33.7916 | 0.630062 | 8.6903 |
| 4500 | 31.95622 | 0.659213 | 7.8636 |
| 4800 | 30.44131 | 0.570594 | 6.9695 |
| 5100 | 29.04059 | 0.606741 | 6.3769 |
| 5400 | 27.68515 | 0.599745 | 5.7748 |

TABLE 1-continued

| Elapsed Time (seconds) | Input Pressure (psi) | Output Pressure (psi) | Weight of Fuel (grams) |
| --- | --- | --- | --- |
| 5700 | 26.6008 | 0.603243 | 5.2231 |
| 6000 | 25.51645 | 0.596247 | 4.71 |
| 6300 | 24.51224 | 0.574092 | 4.2295 |
| 6600 | 23.49696 | 0.556601 | 3.7757 |
| 6900 | 22.69704 | 0.536778 | 3.3506 |
| 7200 | 21.86636 | 0.534446 | 2.9862 |
| 7500 | 21.06644 | 0.518122 | 2.6122 |
| 7800 | 20.35882 | 0.505295 | 2.2651 |
| 8100 | 19.65097 | 0.492469 | 1.9388 |
| 8400 | 18.97366 | 0.450491 | 1.5701 |
| 8700 | 18.35792 | 0.394521 | 1.1778 |
| 9000 | 17.64982 | 0.35954 | 0.8205 |
| 9300 | 17.06487 | 0.337385 | 0.4974 |
| 9600 | 16.38756 | 0.308234 | 0.235 |
| 9900 | 15.74104 | 0.296574 | 0.0919 |
| 10200 | 15.31002 | 0.318729 | 0.0525 |
| 10500 | 14.88671 | 0.35371 | −0.0001 |
| 10800 | 14.54078 | 0.434167 | −0.0128 |
| 11100 | 14.10837 | 0.441163 | −0.0094 |
| 11400 | 13.76244 | 0.45399 | −0.0062 |
| 11700 | 13.44534 | 0.502963 | −0.0049 |
| 12000 | 13.18589 | 0.57176 | −0.0032 |
| 12300 | 12.92644 | 0.600911 | −0.0028 |
| 12600 | 12.69583 | 0.610239 | −0.0011 |
| 12900 | 12.55169 | 0.635892 | 0.0003 |
| 12902.5 | 12.46521 | 0.632394 | 0 |

Figure 22A:
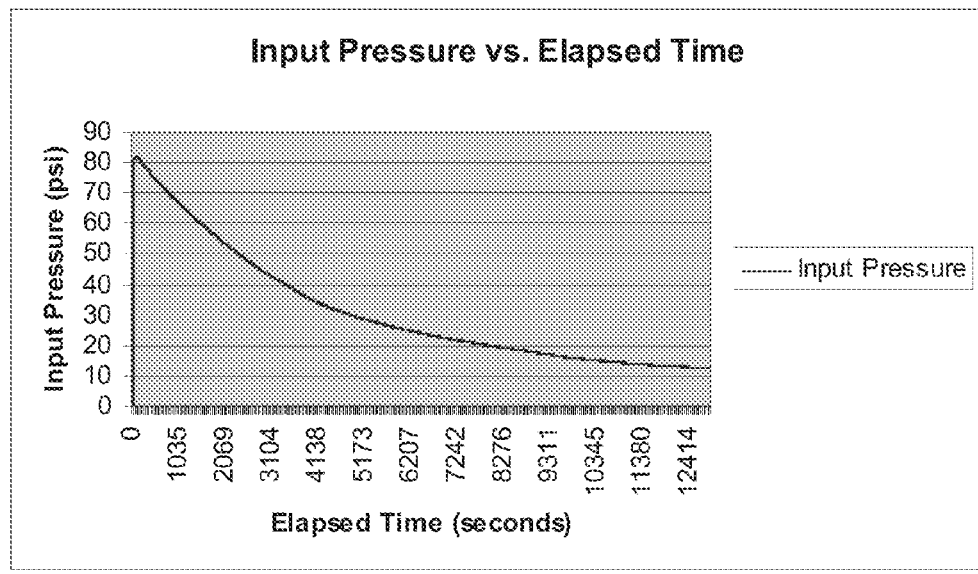
FIGS. 22A-C are the graphs of the input pressure, output pressure and weight, respectively, of an exemplary fuel supply as function of elapsed time.
Figure 22B:
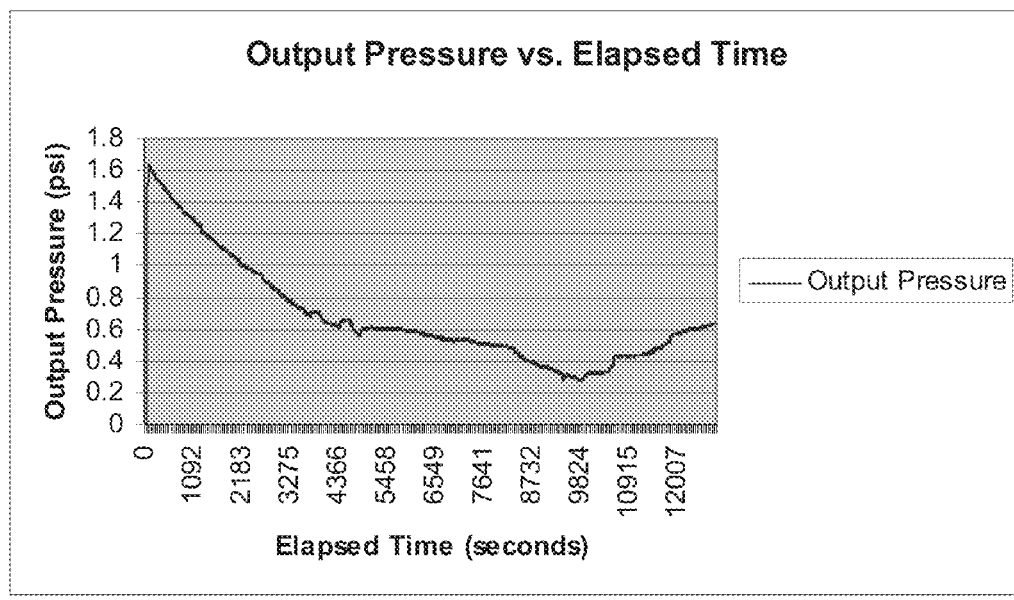
Figure 22C:
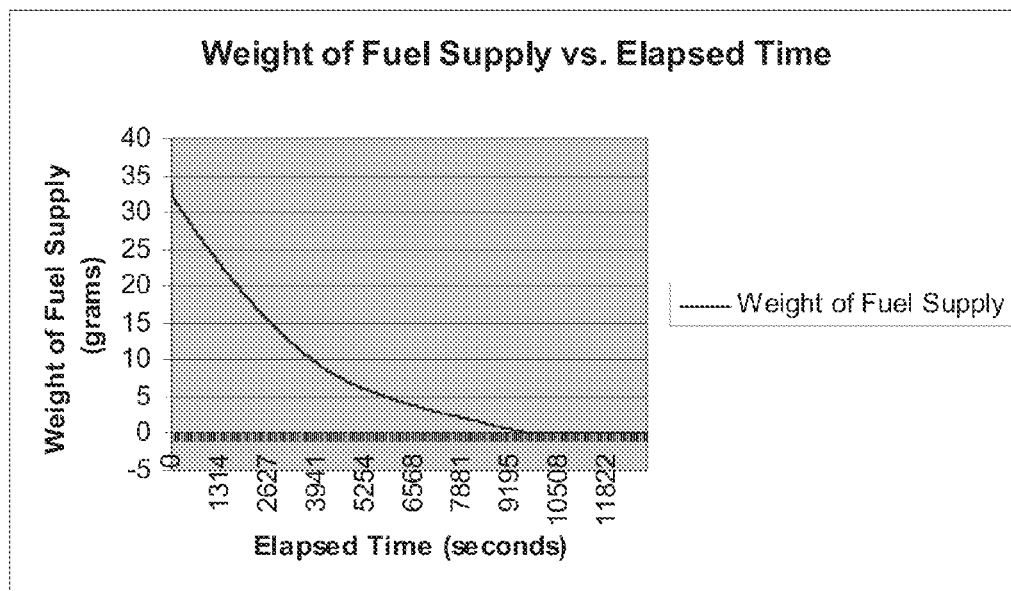

Charts of input pressure, output pressure, and weight of fuel supply as a function of elapsed time are shown in FIGS. 22A-21C.

Another simulation of fuel supply 10, without a pressure regulator 20, was conducted, where a known external source of compressed gas at 2 $psi_g$ pressure was used to urge fuel from liner 28 through second valve 18. The simulation was designed to ascertain whether the outlet pressure from fuel supply 10 would be substantially constant, whether the pressure drop necessary to compress liner 28 and to push fuel across second valve 18 would be acceptable and whether the flow rate would be substantially constant. The outlet pressure is measured down stream from second valve 18. The results are shown below in Table 2.

TABLE 2

| Elapsed Time (Minutes) | Outlet Pressure (psi) | Weight of fuel supply (grams) | Weight of fuel transported (grams) | Remaining Fuel (grams) | Remaining Fuel % | Fuel Delivered | Flow rate (g/min) | Flow rate (ml/m) |
| --- | --- | --- | --- | --- | --- | --- | --- | --- |
| 0 | 1.810 | 228.715 | 0.000 | 18.95 | 100% | — | 0.000 | 0.000 |
| 5 | 1.810 | 227.600 | 1.115 | 17.84 | 94% | 1.12 | 0.223 | 0.282 |
| 10 | 1.810 | 227.000 | 0.600 | 17.24 | 91% | 1.72 | 0.120 | 0.152 |
| 15 | 1.810 | 226.485 | 0.515 | 16.72 | 88% | 2.23 | 0.103 | 0.130 |
| 20 | 1.810 | 225.730 | 0.755 | 15.97 | 84% | 2.99 | 0.151 | 0.191 |
| 25 | 1.778 | 225.239 | 0.491 | 15.48 | 82% | 3.48 | 0.098 | 0.124 |
| 30 | 1.780 | 224.852 | 0.387 | 15.09 | 80% | 3.86 | 0.077 | 0.098 |
| 35 | 1.780 | 224.350 | 0.502 | 14.59 | 77% | 4.37 | 0.100 | 0.127 |
| 40 | 1.790 | 223.916 | 0.434 | 14.16 | 75% | 4.80 | 0.087 | 0.110 |
| 45 | 1.763 | 223.413 | 0.503 | 13.65 | 72% | 5.30 | 0.101 | 0.127 |
| 50 | 1.768 | 222.953 | 0.460 | 13.19 | 70% | 5.76 | 0.092 | 0.116 |
| 55 | 1.774 | 222.465 | 0.488 | 12.70 | 67% | 6.25 | 0.098 | 0.123 |
| 60 | 1.778 | 222.004 | 0.461 | 12.24 | 65% | 6.71 | 0.092 | 0.117 |
| 65 | 1.754 | 221.562 | 0.442 | 11.80 | 62% | 7.15 | 0.088 | 0.112 |
| 70 | 1.765 | 221.110 | 0.452 | 11.35 | 60% | 7.60 | 0.090 | 0.114 |
| 75 | 1.767 | 220.683 | 0.427 | 10.92 | 58% | 8.03 | 0.085 | 0.108 |
| 80 | 1.771 | 220.250 | 0.433 | 10.49 | 55% | 8.47 | 0.087 | 0.109 |
| 85 | 1.746 | 219.819 | 0.431 | 10.06 | 53% | 8.90 | 0.086 | 0.109 |
| 90 | 1.743 | 219.320 | 0.499 | 9.56 | 50% | 9.40 | 0.100 | 0.126 |
| 95 | 1.742 | 218.913 | 0.407 | 9.15 | 48% | 9.80 | 0.081 | 0.103 |
| 100 | 1.744 | 218.581 | 0.332 | 8.82 | 47% | 10.13 | 0.066 | 0.084 |
| 105 | 1.703 | 218.187 | 0.394 | 8.43 | 44% | 10.53 | 0.079 | 0.100 |
| 110 | 1.703 | 217.786 | 0.401 | 8.03 | 42% | 10.93 | 0.080 | 0.101 |

TABLE 2-continued

| Elapsed Time (Minutes) | Outlet Pressure (psi) | Weight of fuel supply (grams) | Weight of fuel transported (grams) | Remaining Fuel (grams) | Remaining Fuel % | Fuel Delivered | Flow rate (g/min) | Flow rate (ml/m) |
|---|---|---|---|---|---|---|---|---|
| 115 | 1.696 | 217.396 | 0.390 | 7.64 | 40% | 11.32 | 0.078 | 0.099 |
| 120 | 1.689 | 217.004 | 0.392 | 7.24 | 38% | 11.71 | 0.078 | 0.099 |
| 125 | 1.645 | 216.637 | 0.367 | 6.88 | 36% | 12.08 | 0.073 | 0.093 |
| 130 | 1.636 | 216.261 | 0.376 | 6.50 | 34% | 12.45 | 0.075 | 0.095 |
| 135 | 1.632 | 215.917 | 0.344 | 6.16 | 32% | 12.80 | 0.069 | 0.087 |
| 140 | 1.613 | 215.545 | 0.372 | 5.78 | 31% | 13.17 | 0.074 | 0.094 |
| 145 | 1.590 | 215.215 | 0.330 | 5.45 | 29% | 13.50 | 0.066 | 0.083 |
| 150 | 1.552 | 214.862 | 0.353 | 5.10 | 27% | 13.85 | 0.071 | 0.089 |
| 155 | 1.488 | 214.484 | 0.378 | 4.72 | 25% | 14.23 | 0.076 | 0.096 |
| 160 | 1.462 | 214.205 | 0.279 | 4.44 | 23% | 14.51 | 0.056 | 0.071 |
| 165 | 1.462 | 213.911 | 0.294 | 4.15 | 22% | 14.80 | 0.059 | 0.074 |
| 170 | 1.220 | 213.645 | 0.266 | 3.88 | 20% | 15.07 | 0.053 | 0.067 |
| 175 | 1.172 | 213.382 | 0.263 | 3.62 | 19% | 15.33 | 0.053 | 0.066 |
| 180 | 1.075 | 213.143 | 0.239 | 3.38 | 18% | 15.57 | 0.048 | 0.060 |
| 185 | 0.980 | 212.928 | 0.215 | 3.17 | 17% | 15.79 | 0.043 | 0.054 |
| 190 | 0.876 | 212.719 | 0.209 | 2.96 | 16% | 16.00 | 0.042 | 0.053 |
| 195 | 0.722 | 212.481 | 0.238 | 2.72 | 14% | 16.23 | 0.048 | 0.060 |
| 200 | 0.636 | 212.356 | 0.125 | 2.60 | 14% | 16.36 | 0.025 | 0.032 |
| 205 | 0.639 | 212.302 | 0.054 | 2.54 | 13% | 16.41 | 0.011 | 0.014 |
| 210 | 0.673 | 212.294 | 0.008 | 2.53 | 13% | 16.42 | 0.002 | 0.002 |
| 215 | 0.692 | 212.285 | 0.009 | 2.52 | 13% | 16.43 | 0.002 | 0.002 |
| 220 | 0.710 | 212.277 | 0.008 | 2.52 | 13% | 16.44 | 0.002 | 0.002 |
| 225 | 0.545 | 212.125 | 0.152 | 2.36 | 12% | 16.59 | 0.030 | 0.038 |
| 230 | 0.559 | 212.085 | 0.040 | 2.32 | 12% | 16.63 | 0.008 | 0.010 |
| 235 | 0.496 | 212.045 | 0.040 | 2.28 | 12% | 16.67 | 0.008 | 0.010 |
| 240 | 0.515 | 212.018 | 0.027 | 2.26 | 12% | 16.70 | 0.005 | 0.007 |

Figure 23:
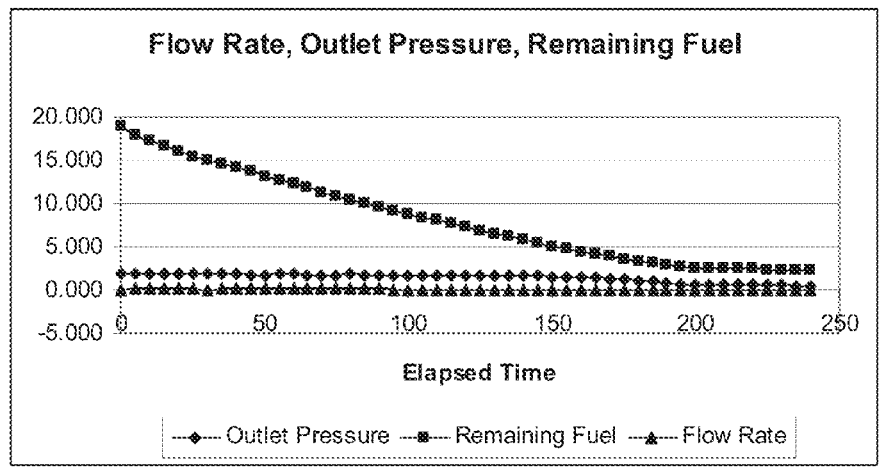
FIG. 23 is a graph of the flow rate, output pressure and remaining fuel as function of elapsed time.

A chart of the flow rate, outlet pressure and remaining fuel as a function of elapsed time is shown in FIG. 23.

Figure 24:
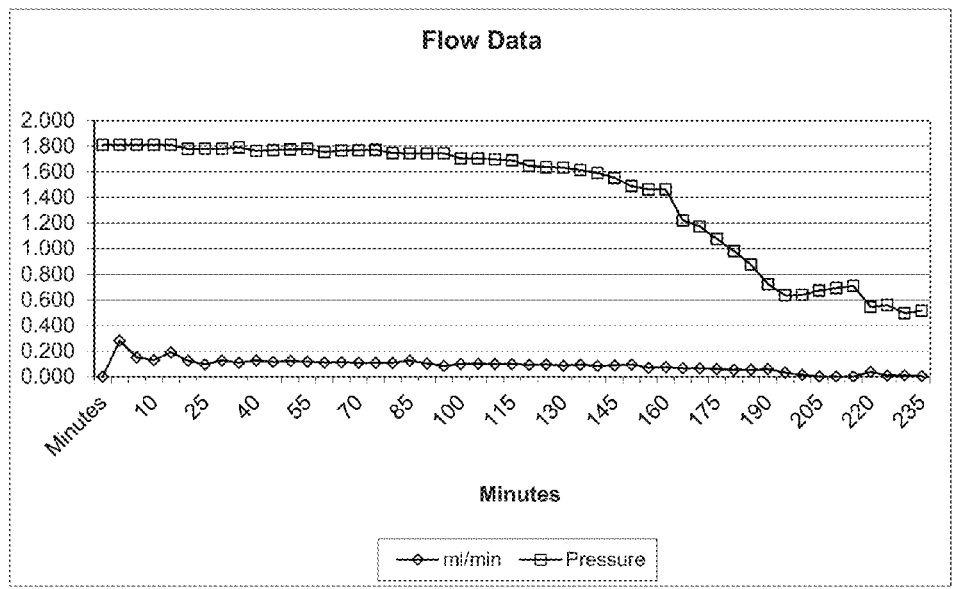
FIG. 24 is a graph of the flow rate and output pressure as function of elapsed time.

Another chart, as illustrated in FIG. 24, showing only the outlet pressure and flow rate as a function of elapsed time is shown below to illustrate more clearly the substantially constant flow rate and outlet pressure of the inventive fuel supply throughout a significant portion of the life of the fuel supply. It is noted that the pressure drop necessary to compress liner 28 and to push fuel through second valve 18 is within an acceptable range.

Any type of gas can be stored in compressed gas chamber 24, including but not limited to, air, nitrogen, carbon dioxide, inert gases, etc. The present invention is not limited to any type of compressed gas. Compressed gas chamber 24 can also contain a liquefied hydrocarbon, such as those used in cigarette lighters. An advantage of using liquefied hydrocarbon is that a lower volume of liquefied hydrocarbon can change into a significantly larger volume of higher pressure gas, thereby significantly reducing the volume of compressed gas chamber 24. Suitable liquefied hydrocarbons include, but are not limited to, butane, iso-propane, diesel and gasoline. Methanol and other alcohols in liquid or gel form can also be used. Suitable gases and other substances usable within compressed gas chamber 24 are disclosed in commonly-owned, co-pending U.S. published Patent Application No. US 2007/0077470 A1, which was filed on Oct. 5, 2005 and has Ser. No. 11/243,767 and commonly-owned, co-pending U.S. published Patent Application No. US 2007/0077463 A1, which was filed on Oct. 5, 2005 and has Ser. No. 11/244,218. These references are incorporated herein by reference in their entireties.

A number of suitable pressure regulators 20 are described in pending commonly-owned, U.S. published Patent Application No. US 2006/0174952A1, which was filed on Jan. 6, 2006 and has Ser. No. 11/327,580. The '952 is incorporated herein by reference in its entirety.

Figure 9A:
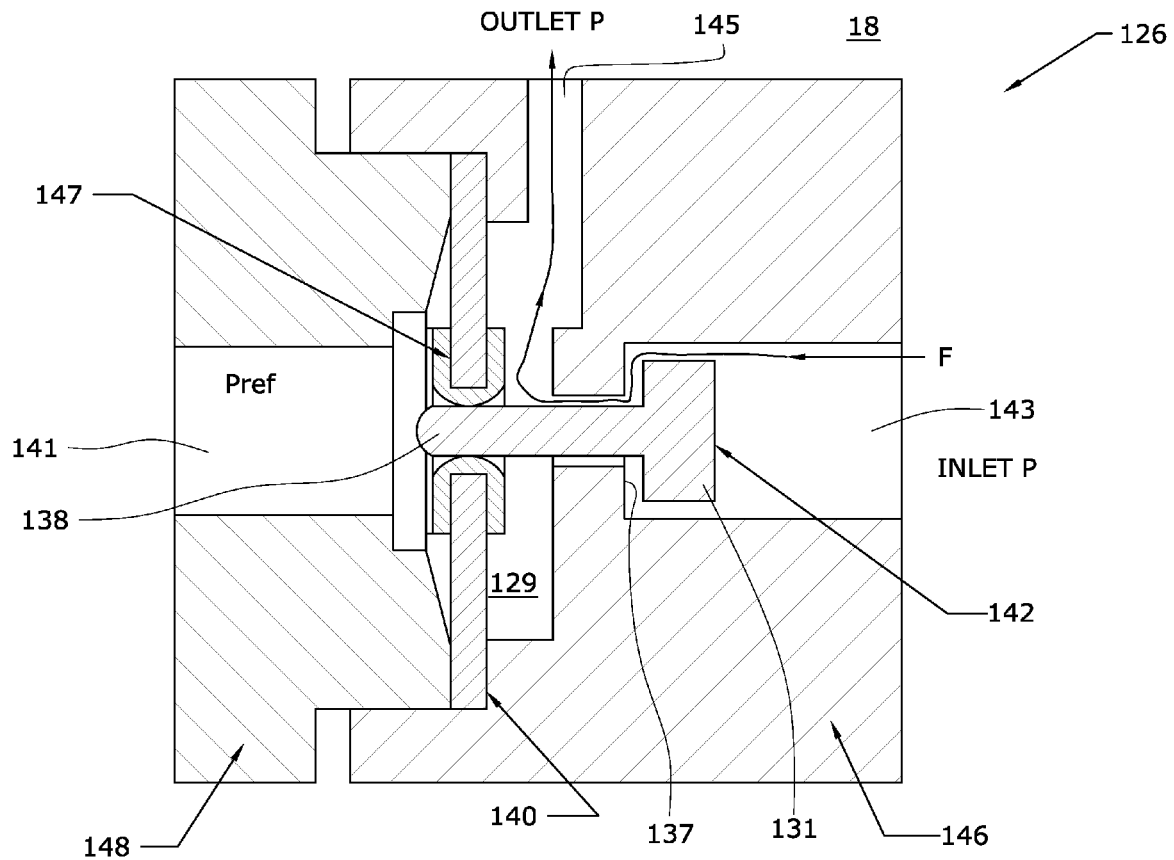

FIGS. 9A and 9B show a first pressure regulator valve 126, which is illustrated as FIGS. 4A and 4B in the '952 reference. For ease of reference, the reference numbers used in the '952 reference are also used herein. Pressure regulator valve 126 includes a pressure sensitive diaphragm 140. In this embodiment, however, diaphragm 140 is sandwiched between two housing elements, a valve housing 146 and a valve cover 148, and has a hole 149 formed through its center, as best seen in FIG. 9B. Additionally, a void 129 is formed at the interface of valve housing 146 and valve cover 148 to allow diaphragm 140 to move or flex due to the pressure difference between the inlet pressure at valve housing channel 143, the outlet pressure at channel 145, and a reference pressure, $P_{ref}$. Valve housing 146 has an internal configuration that defines a flow path through pressure regulator valve 126. Specifically, channels 143 and 145 are formed in valve housing 146, where valve housing channel 143 has the inlet pressure and is in fluid communication of compressed gas chamber 24 when first valve 16 is open, and channel 145 has the outlet pressure and is in fluid communication with liquid fuel chamber 26 when first valve 16 is open. Further, a vent channel 141 is formed in valve cover 148 so that diaphragm 140 is exposed to the reference pressure, which may be atmospheric pressure or another reference pressure. Alternatively, diaphragm can be spring biased to a reference pressure.

Valve housing channel 143 is configured to slidingly receive a valve stem 142. Valve housing channel 143 is configured to narrow at or near the interface of valve housing 146 and valve cover 148 to form a shoulder 137. Valve stem 142 is preferably a unitary element having a slender stem portion 138 and a cap 131. This configuration allows slender stem portion 138 to extend through the narrow portion of valve housing channel 143 while cap 131 comes to rest against shoulder 137. As such, cap 131 and shoulder 137 both include sealing surfaces to close the flow path through pressure regulator valve 126 at shoulder 137 when cap 131 is seated thereagainst. Additionally, a grommet 147 secures valve stem 142 within hole 149 in diaphragm 140, thereby creating a seal and a secure connection between diaphragm 140 and valve stem 142. Therefore, as diaphragm 140 moves, valve stem 142 also moves such that cap 131 is seated and unseated against shoulder 137 thereby opening and closing pressure regulator valve 126.

When pressure regulator valve 126 is connected to first valve 16, discussed above, the relatively high pressure from compressed gas chamber 24 is communicated to the inlet, namely, valve housing channel 143. The outlet pressure from this pressure regulator valve at the outlet, namely, channel 145, is communicated through first valve 16 into outer flow channel 42 to pressurize liquid fuel chamber 26. When the pressure in liquid fuel chamber 26 is lower than the necessary pressure to urge the liquid fuel out of fuel supply 10, pressure regulator valve 126 is in an open configuration as shown in FIG. 9A, where diaphragm is unflexed and cap 131 of valve stem 142 is unseated from shoulder 137. As such, compressed gas flows through pressure regulator valve 126 and into liquid fuel chamber 26. When the pressure in liquid fuel chamber 26 reaches "x" psi, as discussed above, diaphragm 140 deforms toward valve cover 148 to such an extent that cap 131 of valve stem 142 seats against shoulder 137 to seal pressure regulator valve 126. As more liquid fuel is transported out of liquid fuel chamber 26, the volume of liner 28 decreases, thereby decreasing the pressure inside liquid fuel chamber 26. This decrease in pressure causes diaphragm 140 to move away from valve cover 148 moving valve stem 142 to the open position to allow additional compressed gas to enter liquid fuel chamber 26 to restart the cycle.

The outlet pressure $P_{outlet}$ at which pressure regulator valve 126 opens or closes can be adjusted by adjusting the length of the valve stem or the gap that cap 131 travels between the open and closed position, the flexibility or spring constant of diaphragm 140, and/or by adjusting $P_{ref}$. Stem portion 138 is sized and dimensioned to be movable relative to grommet 147 to adjust length of stem portion 138. The longer the length of stem portion 138 between grommet 147 and cap 131, the higher the pressure needed to close pressure regulator valve 126. Preferably, the outlet pressure is substantially constant or is kept within an acceptable range, and the reference pressure, $P_{ref}$, is selected or adjusted to provide such an outlet pressure. In other words, $P_{ref}$ is set so that when the inlet pressure exceeds a predetermined amount, diaphragm 140 closes to minimize high or fluctuating outlet pressure at channel 145.

Figure 10A:
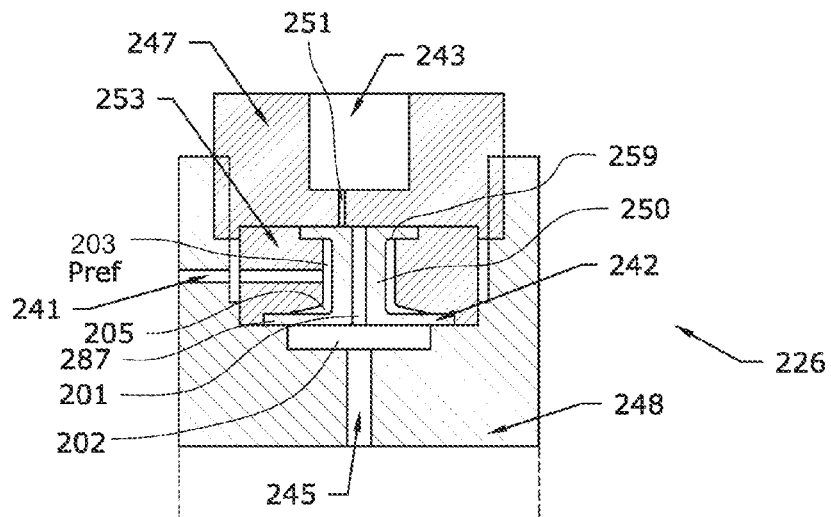
FIG. 10A is a cross-sectional view and FIG. 10B is an exploded view of another suitable pressure regulator.
Figure 10B:
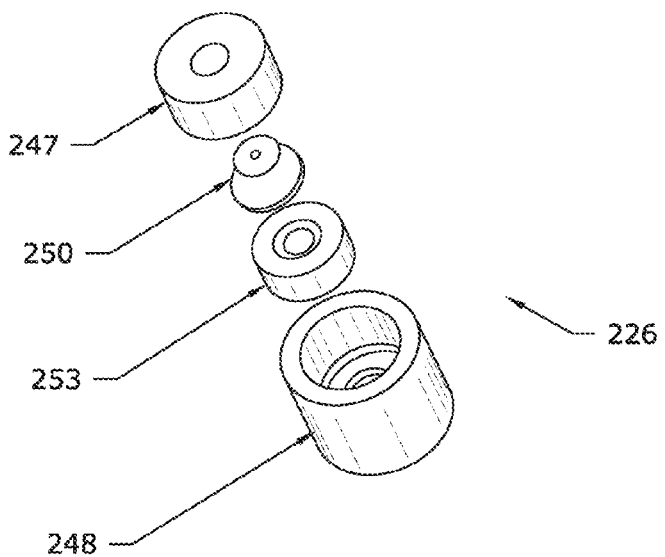

Another pressure regulator valve 226 is shown in FIGS. 10A and 10B, which is disclosed in the '952 reference as FIGS. 4C-4D. Pressure-regulator valve 226 is similar to pressure regulator valve 126 discussed above, as a valve housing 248 is attached to a valve cap 247. Formed in valve cap 247 is an inlet 243 connected to compressed gas chamber 24, while a pressure regulated outlet 245 connected to liquid fuel chamber 26 is formed in valve housing 248. A hole 251 is formed in a lower portion of valve cap 247. Preferably, hole 251 is slightly off-center from the longitudinal axis of pressure regulator valve 226.

Sandwiched and retained between valve cap 247 and valve housing 248 is a deformable capped cylinder 250. Capped cylinder 250 includes an upper end 259, a lower end 287, and a hole or channel 201 formed therethrough. Capped cylinder 250 is made of any deformable, elastomeric material known in the art, such as rubber, urethane, or silicone. Capped cylinder 250 functions similar to a pressure-sensitive diaphragm.

Upper end 259 is positioned adjacent valve cap 247 such that when no fluid flows through pressure regulator valve 226 upper end 259 is flush against a lower surface of valve cap 247. The edges of upper end 259 are fixed in position so that even if the remainder of upper cap 259 flexes, the edges remain stationary and sealed.

Lower end 287 is positioned adjacent valve housing 248. A void 202 is formed in valve housing 248 and is positioned directly below lower end 287 to allow lower end 287 to flex freely. Preferably, lower end 287 has a different diameter than upper end 259, as explained below.

A retainer 253 made of a substantially rigid material surrounds capped cylinder 250. Retainer 253 defines a hole 241 to connect a second void 203 formed circumferentially between capped cylinder 250 and retainer 253 with a reference pressure $P_{ref}$. Portion 205 of second void 203 is configured to extend partially along and on top of lower end 287.

To regulate pressure, inlet gas (or liquid) enters pressure-regulator 226 through inlet 243 and passes into hole 251. Hole 251 can be a circular channel or ring defined on cap 247. Upper end 259 seals hole 251 until the pressure exerted by the inlet gas or liquid from inlet 243 reaches a threshold to deform upper end 259. When the gas deforms upper end 259, the deformation translates through the body of cylinder 250 to also deform lower end 287. Once upper end 259 deforms, the gas is able to pass through hole 251, through capped cylinder 250 and out regulated outlet 245.

Since the applied forces on capped cylinder 250 are the products of the applied pressure times the area exposed to that pressure, the forces acting on capped cylinder 250 can be summarized as follows:

Inlet Force+Reference Force ↔ Outlet Force (P at inlet 243·Area of upper end 259)+($P_{ref}$·Area of portion 205) ↔ (P at outlet 245·Area of lower end 287)

When the outlet force is greater than the inlet and reference forces, then pressure regulator valve 226 is closed, and when outlet force is less than the inlet and reference forces, the pressure regulator valve 226 is open. Since in this embodiment the outlet force has to counter-balance both the inlet and reference forces, the area 242 of lower end 287 is advantageously made larger than the area of upper end 259, as shown, so that the outlet force may be larger without increasing the outlet pressure. By varying the areas of ends 259 and 287 and portion 205, the balance of forces on capped cylinder 250 can be controlled and the pressure differential required to open and close pressure regulator valve 226 can be determined.

Since reference pressure $P_{ref}$ tends to press down on lower end 287, this additional pressure can lower the threshold pressure to initiate flow, i.e., reference pressure $P_{ref}$ is relatively high to assist the gas in deforming capped cylinder 250. Reference pressure $P_{ref}$ may be adjusted higher or lower to further regulate the pressure of the gas leaving outlet 245.

Figure 11A:
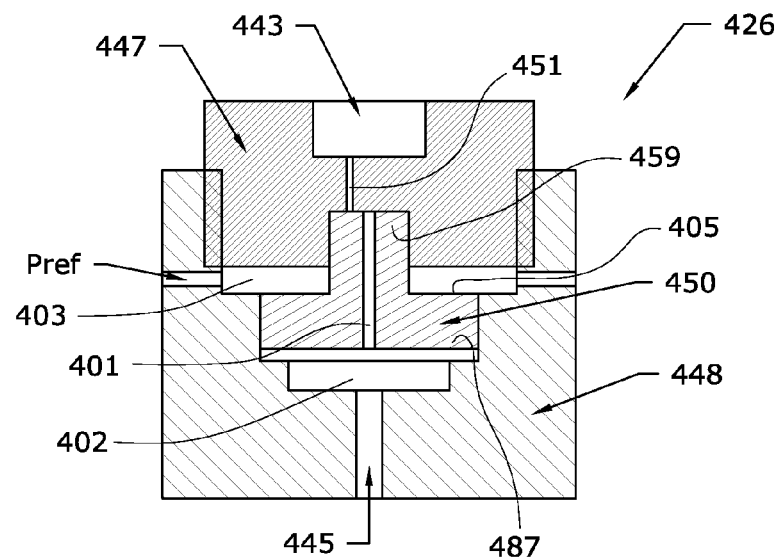
FIG. 11A is a cross-sectional view and FIG. 11B is an exploded view of another suitable pressure regulator.
Figure 11B:
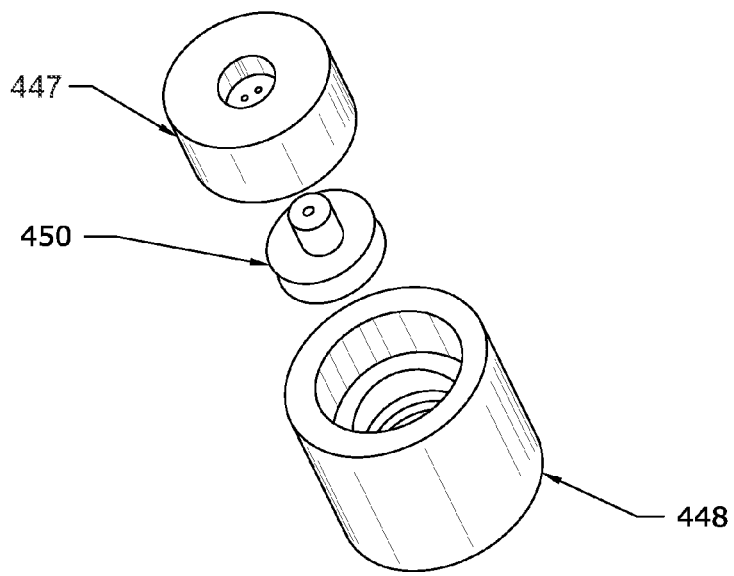

Another embodiment of a pressure regulator valve 426 is shown in FIGS. 11A and 11B, which are FIGS. 6A-6B in the '952 reference. Pressure regulator valve 426 is similar to pressure regulator valve 226, discussed above, except that pressure regulator valve 426 has a slidable piston 450 instead of flexible capped cylinder 250. Pressure regulator valve 426 has valve housing 448 attached to a valve cap 447. Formed in valve cap 447 is an inlet 443 connected to compressed gas chamber 24, while a pressure regulated outlet 445 connected to liquid fuel chamber 26 is formed in valve housing 448. A hole 451 is formed in a lower portion of valve cap 447. Preferably, hole 451 is slightly off-center from the longitudinal axis of pressure regulator valve 426. Hole 451 may comprise a plurality of holes formed as a ring so that the inlet pressure is applied uniformly on slidable piston 450.

Slidably disposed between valve cap 447 and valve housing 448 is a slidable piston 450. Slidable piston 450 includes an upper portion 459 forming one end having a first diameter, a lower portion 487 having a second diameter that forms another end and which is preferably larger than the diameter of upper portion 459, and a hole 401 formed therethrough. Slidable piston 450 is made of any rigid material known in the art, such as plastic, elastomer, aluminum, a combination of elastomer and a rigid material or the like.

A space 402 is formed in valve housing 448 to allow piston 450 to slide between cap 447 and housing 448. A second void 403 is formed between slidable piston 450 and valve housing 448. Void 403 is connected with a reference pressure $P_{ref}$. A portion 405 (which is a space) of void 403 is positioned opposite to lower end 487, so that a reference force can be applied on piston 450.

Upper portion 459 is positioned adjacent valve cap 447 such that when the outlet force exceeds the inlet force and the reference force, as discussed above, upper portion 459, which forms one end of slidable piston 450, is flush against a lower surface of valve cap 447 to close pressure regulator valve 426, as shown in FIG. 11A. When the outlet force is less than the inlet and reference forces, piston 450 is pushed toward housing 448 to allow fluids, such as hydrogen gas, to flow from inlet 443 through hole(s) 451 and hole 401 to outlet 445. Again, as discussed above with reference to pressure regulator valve 226, the surface areas of ends 459 and 487, and of space 405 can be varied to control the opening and closing of pressure regulator valve 426.

Figure 12C:
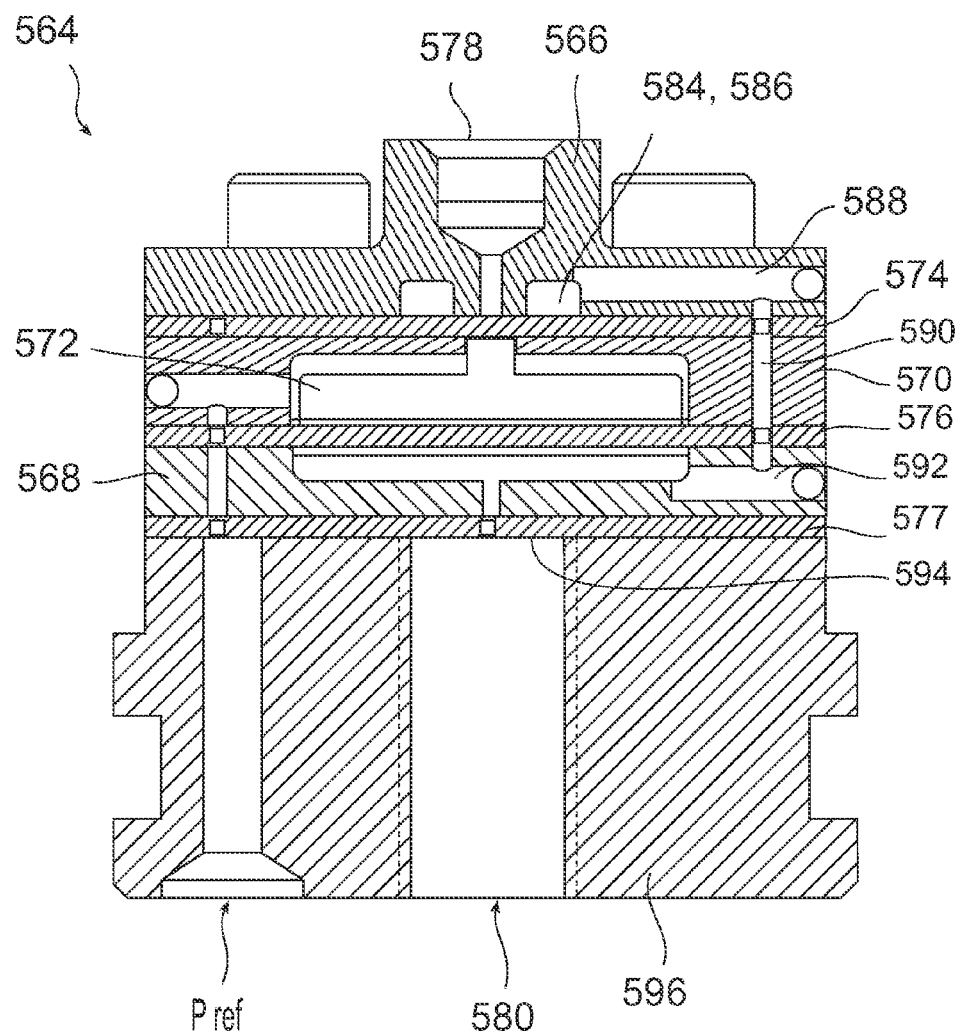
FIG. 12C is a cross-sectional view of another version of the pressure regulator of FIGS. 12A and 12B.

Another suitable pressure regulator is illustrated in FIGS. 12A-12B. FIGS. 12A-C are previously disclosed in commonly-owned, co-pending U.S. Provisional Application Ser. No. 60/887,918, which was filed on Feb. 2, 2007, which is incorporated herein by reference in its entirety. For ease of reference, the first digits of the reference numbers used in provisional '918 have been changed when used herein, in order not to overlap with the reference numbers used above.

An exemplary pressure regulator 564 is illustrated in FIG. 12A-12B. Regulator 564 comprises inlet housing 566, outlet housing 568 and retainer 570 disposed therebetween. Movably disposed within retainer 570 is piston 572. A first diaphragm 574 is clamped between inlet housing 566 and retainer 570 and a second diaphragm 576 is clamped between outlets housing 568 and retainer 570. Inlet housing 566 defines inlet channel 578 connected to compressed gas chamber 24 and outlet housing 568 defines outlet channel 580 connected to liquid fuel chamber 26. The interior of retainer 570, where piston 572 is housed, can be exposed to a reference pressure, which may be atmospheric pressure. A ball 582 can be provided below first diaphragm 574 directly below inlet channel 578 to help seal the inlet channel. As shown, first diaphragm 574 is exposed to the inlet pressure and second diaphragm 576 is exposed to the outlet pressure.

Since the applied forces on piston 572 are the products of the applied pressure times the area exposed to that pressure, the forces acting on piston 572 can be summarized as follows: The inlet diaphragm forces are:

Inlet pressure·inlet area=reference pressure·inlet area+
piston force(upper surface)

The outlet diaphragm forces are:

Outlet pressure·outlet area=reference pressure·outlet
area+piston force(lower surface)

Since the force on the upper surface equals the force on the lower surface, the piston force is the same in both equations. Solving both equations for piston force and equating them:

(Inlet P−reference P)·inlet area=(outlet P−reference
P)·outlet area

This equation can be rewritten to:

(Outlet P−reference P)=(Inlet P−reference P)·inlet
area/outlet area

For the case where the reference pressure is 0 psi relative or 1 atmosphere:

Outlet P=Inlet P·inlet area/outlet area

For the case where the reference pressure is not 0 psi relative, both sides of the piston are influenced by the reference pressure relative to their respective areas. During the operation of the regulator, the inlet area changes. Before the outlet pressure rises enough to shut off the inlet, the inlet area is equal to the upper surface of the piston. After the outlet pressure rises enough to shut off the inlet the inlet area shrinks to the small inlet opening. This feature will reduce piston oscillation with slight outlet pressure drops.

When the outlet force is less then the inlet force, the inlet pressure forces first membrane downward to open a flow path from inlet channel 578 to inner circular channel 584, which is connected to top lateral channel 586, which is connected to outer circular channel 588 and to connecting channel 590, which is connected to lower lateral channel 592 and to outlet channel 580. Advantageously, outlet channel 580 is enlarged at 594 to allow the gas to expand and to lose some additional pressure before exiting. Outlet channel 580 is also enlarged so that regulator 564 can be fitted to the other component(s) of the fuel cell system. Lateral channels 586 and 592 are sealed by a ball as shown in FIG. 12A.

Another embodiment of pressure regulator 564 is shown in FIG. 12C, which operates in the same manner as the embodiment of FIGS. 12A-12B. As illustrated in FIG. 12C, regulator 564 can also have an outlet diaphragm/gasket 577 and end cap 596 attached to the bottom of outlet housing 568. End cap 596 can have a channel to communicate the reference pressure to piston 572, and a more enlarged outlet channel 580 for the exiting gas to take a larger pressure drop before exiting. Diaphragm/gasket 577 can be replaced by an O-ring.

Figure 13:
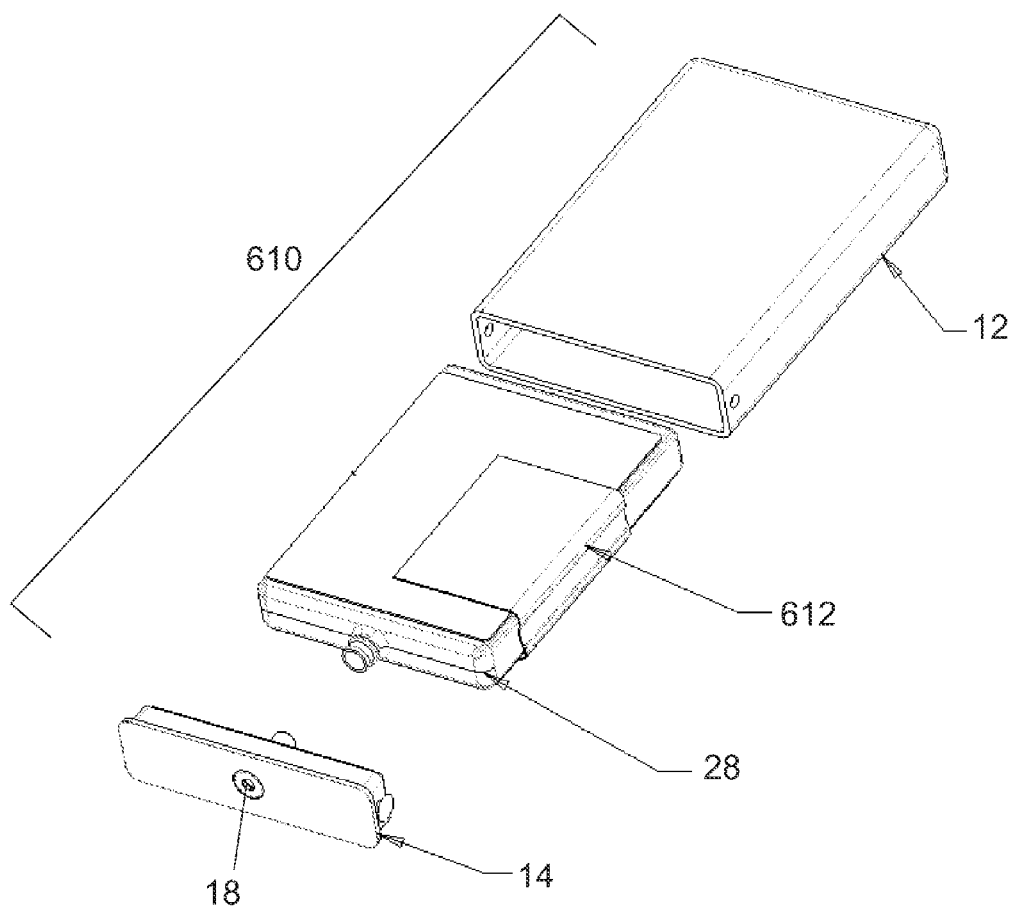
FIG. 13 is an exploded perspective view of another pressurized fuel supply in accordance with the present invention.

In accordance with other aspects of the present invention, fuel supply 610 is provided without a pressure regulator, as shown in FIG. 13. This fuel supply also has outer casing 12 with lid 14 and inner liner 28. A second valve 18 is provided to communicate liquid fuel from inner liner 28 to the reaction chamber to produce hydrogen, to the fuel cell or to the device that the fuel cell powers. Pressure is applied to inner liner 28 via spring clip 612. To evenly distribute pressure on inner liner 28, rigid plates 614 are provided on each side of inner liner 28.

Figures 14, 14A:
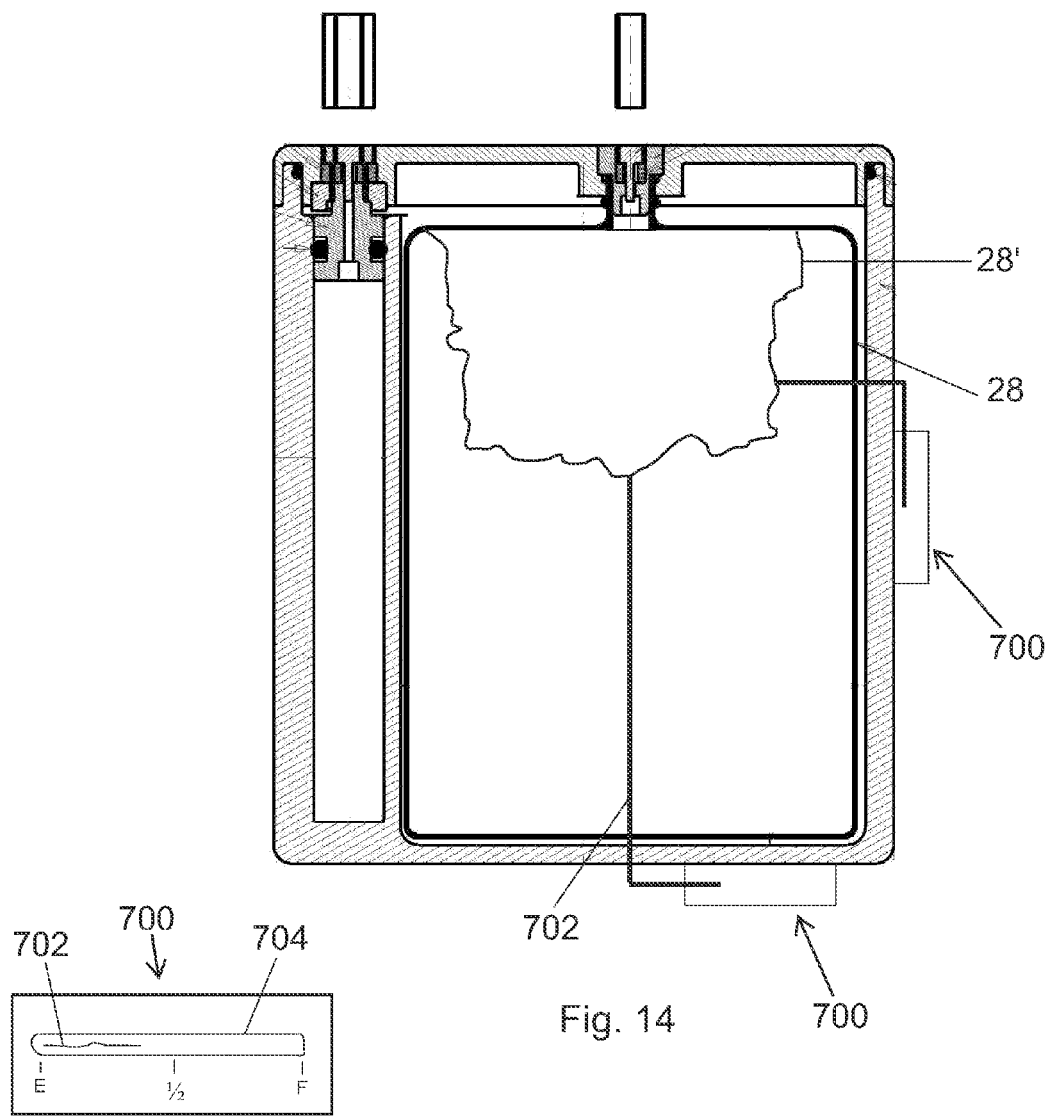
FIG. 14 is a cross-sectional view of the fuel supply of FIG. 4 with a fuel gage.
FIG. 14A is a front view of the fuel gage.

To gage the amount of fuel remaining in the fuel supply, fuel gage 700 is provided as shown in FIGS. 14 and 14A. Fuel gage 700 comprises thread 702 and readout 704. Thread 702 is attached at one end to the bottom or side of inner liner 28. As fuel is transported out of liner 28, the liner shrinks, shown at 28' in FIG. 14. The shrinking inner liner pulls thread 702 inward. As thread 702 is pulled, the opposite end moves along readout 704 to show the amount of remaining fuel. Calibration may be required to accurately mark readout 704, and the hash marks on readout 704 (e.g., E, ¼, ½, ¾, F) may not be evenly spaced from each other.

In the event liner 28 is re-inflated with gas caused by the vaporization of fuel contained in inner liner 28, since thread 702 is flexible, the re-inflated inner liner would not push thread 702 outward, thereby the reading on fuel gage 700 would not change due to inner liner re-inflation. Hence, advantages of fuel gage 700 include simplicity, accuracy and repeatability.

Figure 15A:
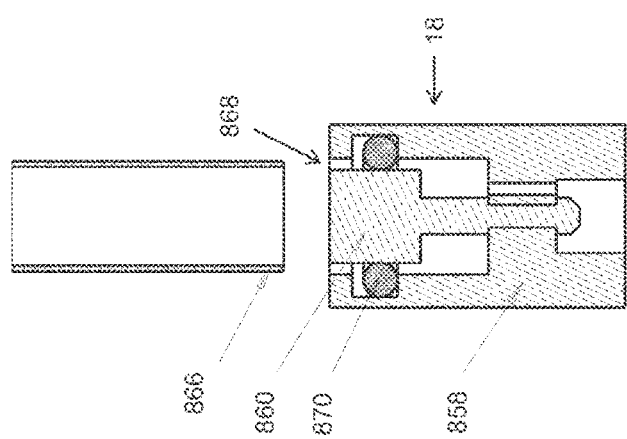
FIGS. 15a-15c are cross-sectional views of another exemplary valve according to the present invention showing the opening sequence from closed in FIG. 15a to engaged and open in FIG. 15b-15c.
Figure 15B:
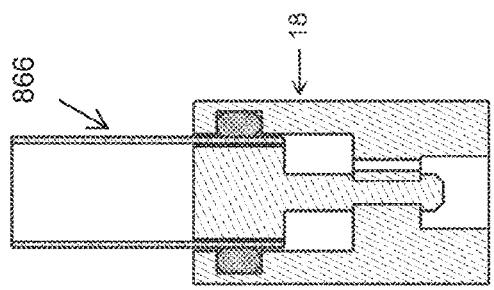
Figure 15C:
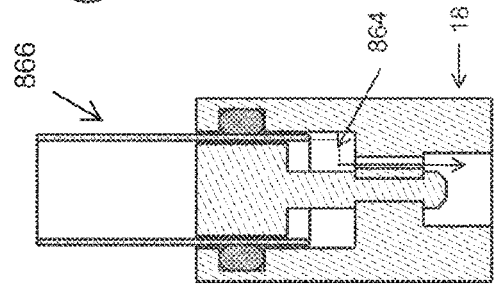
Figure 15D:
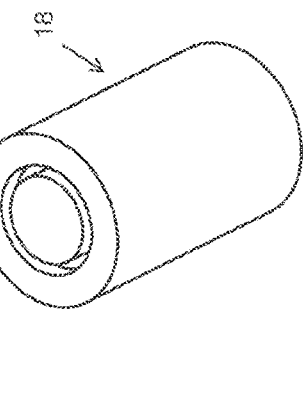
FIG. 15d is an exploded perspective view of the valve.

Returning to the type of valves 16, 18 that can be used, in other alternative embodiments, as shown in FIG. 15(a)-15(c)

and FIGS. 16(a)-16(c), first valve 16 or second valve 18 can have a sealing member 870 (e.g., an O-ring, a sealing face, a washer, an overmolded elastomeric portion, an elastomeric ball or the like) located near the entrance of either valve. For example, as shown in FIGS. 15(a)-15(c) and FIGS. 16(a)-16(c), sealing member 870 can be an O-ring residing in grooves defined within a valve body 858 of second valve 18. The seal is provided between valve body 858, sealing member 870 and center post 860. Space 868 is provided between valve body 858 and center post 860. In this embodiment, tube 866 is sized and dimensioned to be larger than center post 860, and when tube 866 is inserted into space 868 it pushes sealing member 870, in this case an O-ring, outward to allow a flow channel 864 between tube 866 and center post 860 to form, as shown in FIGS. 15(b) and 15(c), which provides a flow path. Further insertion of tube 866, shown in FIG. 15(c), ensure stability of tube 866 inside valve body 858. When tube 866 is first inserted into space 868 as shown in FIG. 15(b), an inter-component seal is optionally formed between tube 866 and valve body 858. FIG. 15(d) shows an exploded view of second valve 18 and tube 866.

The embodiment of FIGS. 16(a)-(d) is similar to the embodiment of FIGS. 15(a)-(d), except that in addition to the seal provided by the O-ring, namely, sealing member 870, a second seal is provided by elastomeric seal 862 and center post 860. Here, when tube 866 pushes the O-ring that is sealing member 870 aside, second valve 18 remains sealed, as shown in FIG. 16(b), until tube 866 compresses elastomeric seal 862, as shown in FIG. 16(c), to establish the flow path provided by flow channel 864. FIG. 16(d) shows an exploded view of mating tube 866 and second valve 18.

Although the sequence in FIGS. 15(a)-15(c) and FIGS. 16(a)-16(c) is shown for second valve 18, a comparable sequence could be applied to form an inter-component seal between tube 48 and first valve 16 and thereafter open internal seals within first valve 16.

The closing sequence of either first valve 16 or second valve 18 is similar to the reverse process of the above-described opening sequence. Fuel supply 10, such as may be a cartridge, is first disengaged from a device, either manually or automatically using any ejection mechanism known in the art, and any compressed seal (e.g., elastomeric seals 38, 44, 62, 862, O-rings 38', 44' and 62', or sealing member 870) releases its stored energy and returns to its original position. Advantageously, in one particular embodiment, the compressed seal itself can act as the ejection mechanism. As a consequence, no external spring force is necessary to eject fuel supply 10, which may be a cartridge, and one conserves space within the cartridge embodiment of the fuel supply 10. After the cartridge is ejected and the elastomeric seals return to their original position, a center post once again engages with the elastomeric seals to close off flow paths to the fuel cartridge.

FIGS. 17(a)-(d) illustrate another embodiment of the present invention. As shown, a connecting valve 872 comprising two valve components 874 and 876. One valve component is mated to either a fuel supply or a device (e.g., a fuel cell, refilling device, or any other device suitable for use in a fuel cell system), and another valve component is mated to the other of the fuel supply or device. Preferably, a first valve component 874 is mated to a device, and a second valve component 876 is preferably mated to a fuel supply. FIGS. 17(a)-17(c) show a sequence depicting the connection of first valve component 874 and second valve component 876 and the opening of internal seals therein, and FIG. 17(d) shows an exploded view of connecting valve 872.

First valve component 874 comprises a housing with a top portion 877a and a bottom portion 877b. The top portion 877a encases a hose tube 878 that connects fluidly with an O-ring 880. The O-ring 880 forms an internal seal with center post 881, which is shown as being integrally made with top portion 877a of the housing Inner tube 882, which has a pair of diametrically opposite apertures 884, is provided to selectively compress O-ring 880. The inner tube 882 is sized and dimensioned to fit within an outer tube 886. Tubes 882 and 886 are sized and dimensioned to define a space therebetween to be a part of a flow path. Both inner tube 882 and outer tube 886 are located within bottom portion 876b, and may be connected to each other by spokes or webs (not shown) to maintain their relative positions. When O-ring 880 is not compressed, it abuts with center post 881 to seal first valve component 874. When it is compressed, a flow path through first valve component 874 is established from hose tube 878 through compressed O-ring 880 into the hollow end of inner tube 882 and through aperture(s) 884 and through the space between inner tube 882 and outer tube 886.

The second valve component 876 also comprises several elements including a housing 888 with a top portion 888a and bottom portion 888b. Advantageously, a center post 890 is fixedly attached to bottom portion 888b and has angular seating surfaces that form an internal seal with an O-ring 892. The bottom portion 888b also has a hose tube 894 that connects fluidly to O-ring 892. Outer tube 886 of first valve component 874 is also larger than center post 890 to allow fluid to flow therebetween.

Both the first valve component 874 and the second valve component 876 can be connected together by bolts 896 in channels 898. Furthermore, an O-ring (not shown) can be provided between first valve component 874 and second valve component 876 in order to facilitate an inter-component seal between the two valve components.

FIG. 17(a) shows first valve component 874 as being unconnected to second valve component 876. To connect the fuel supply to the fuel cell and to transport fuel from the fuel supply to the fuel cell, outer tube 886 from first valve component 874 is inserted into the space 900 around center post 890 in second valve component 876, as shown in FIG. 17(b), until it reaches O-ring 892. In FIG. 17(c), the internal seals in first valve component 874 and second valve component 876 are opened to establish flow path 901. The internal seal in the first valve component 874 opens when center post 890 pushes against inner tube 882, which in turn compresses O-ring 880. The internal seal in the second valve component 876 opens when outer tube 886 of first valve component 874 compresses O-ring 892. A flow path is established in second valve component 876 from hose tube 894 around compressed O-ring 892 and through the space between center post 890 and outer tube 886 of first valve component 874. As shown in FIG. 17(c), flow path 901 is a combination of the flow paths in first valve component 874 and in second valve component 876. Fuel may flow through flow path 901 in either direction from hose tube 878 to hose tube 894, and in reverse.

When establishing flow path 901, first valve component 874 can be opened simultaneously with second valve component 876, or the two valve components may be timed to open in a sequential manner after a connection is made between them. As will be recognized by those skilled in the art, in some situations advantage may be found in opening the flow path to the device prior to opening the flow path to cartridge 10, for example to ensure that the device is prepared to receive fluid or gas prior to accessing the fuel stored in cartridge 10. This sequential opening may be attained by simply adjusting the length of inner tube 882, outer tube 886, or center post 890. For example, if first valve component 874 is on the device, outer tube 886 may be shortened, or inner tube 882 or center post 890 may be lengthened. In such a case, center post 890 moves inner tube 882 prior to outer tube 886 engaging with O-ring 892. Alternatively, if second valve component 876 is on the device, outer tube 886 can be lengthened so that it compresses O-ring 892 prior to inner tube 882 engaging with center post 90. Any of these structures or combinations thereof may also result in one valve component having a longer stroke to open its flow path than the other valve component so that one valve component has a longer opening sequence than the other valve component.

Another version of first valve component 874' is shown in FIGS. 18(a) and 18(b). Here, the center post 881 is attached to a top portion 877a of the housing via an interference fit, and a lower or bottom portion 877b of the housing is combined with outer tube 886. Inner tube 882 is allowed to move slightly up and down relative to lower or bottom portion 877b/outer tube 886 to compress and uncompress O-ring 880. The operation of this first valve component 874' is similar to first valve component 874 described in FIGS. 18(a)-(d).

Another version of first valve component 874" is shown in FIGS. 19(a)-(b). Here, center post 881 is extended downward or outward and is fixed to a first or top portion 877a of the housing by interference fit. A single tube 882/886 replaces inner tube 882 and outer tube 886 and is movable to compress O-ring 880, which provides a seal with center post 881 as described above. Tube 882/886 fits outside of center post 881 and provides a gap therebetween. Retainer ring 905 is designed to keep tube 882/886 within first valve component 874" by interfering with outer ring 903 of tube 882/886. When O-ring 880 is compressed, a flow path is established from tube 878 around the small stem of center post 881 and around compressed O-ring 880 and into the space between tube 882/886 and center post 881. When connecting to second valve component 876, shown in FIGS. 17(a)-(d), tube 882/886 compresses O-ring 892 of second valve component 876, as well as O-ring 880 of first valve component 874, either simultaneously or in sequence as discussed above.

Referring to FIGS. 20(a)-(d), another version of second valve 18 is shown. In this embodiment, center post 860 is made integral to valve body 858, but can be made separately and affixed to valve body 858 as discussed above and below in connection with FIGS. 21(a)-(b). A sealing member, namely elastomeric seal 862, which in this case is a non-flat washer or a lip washer, provides a lip seal with center post 860. As best shown in FIG. 20(a), the lip washer 962 is retained between valve body 858 and retainer 907. The sealing portion of the lip washer 962 is oriented inward and presses against center post 860, as shown, to provide the seal. In this embodiment, space 868 is provided between retainer 907 and center post 860, and is sized and dimensioned to receive tube 866. Also, a clearance is provided between tube 866 and center post 860 to allow fuel to flow therethrough. As shown in FIG. 20(b), tube 866 is inserted into second valve component 18 through space 868 until it reaches the lip washer 962 and beyond as shown in FIG. 20(c). Once tube 866 is pushed past the lip washer 962 (i.e., an elastomeric seal), a fuel flow path provided by flow channel 864 is established as shown.

FIGS. 21(a)-(b) show a variation of the valve component of FIGS. 20(a)-(d). These two valve components are similar to each other except that washer, which is an elastomeric seal 862, is a flat washer and center post 860 is made separate from valve body 858. Furthermore, valve body 858 has cut-out channel 909 formed therein to be a part of the flow path that includes flow channel 864.

Other embodiments of the present invention will be apparent to those skilled in the art from consideration of the present specification and practice of the present invention disclosed herein. For example, in lieu of inner liner 28 liquid fuel chamber 26 may comprise a liquid fuel compartment and a gas compartment in fluid communication with the output of the pressure regulator, separated by a movable, sealed piston. Of course, an inner liner can also be used with movable piston. Alternatively, instead of an inner liner and a movable piston, liquid fuel chamber 26 may have a flexible tube with a weight at one end and is connected to second valve 18 at the other end. The weighted end of the flexible tube should be in contact with the liquid fuel at any orientation of the fuel supply 10, and the compressed gas in contact with the liquid fuel at the liquid/gas interface provide the pressure to urge the liquid fuel through the flexible tube toward second valve 18. Weighted flexible fuel tubes are described in U.S. Patent Publication Number 2006/0191199, which is incorporated herein by reference in its entirety. If the orientation of fuel supply does not change, then the weighted flexible tube can be replaced by a fixed siphon tube.

Additionally, compressed gas chamber 24 can be located outside of fuel supply 10. For example, a compartment in the device/fuel cell can be provided to accept a compressed gas cartridge, which pierces the gas cartridge upon insertion into the compartment. Furthermore, compressed gas chamber 24 or the compressed gas cartridge can be sealed by a foil or other gas impermeable membrane that can be peeled away prior to the first use to prolong the shelf life of fuel supply 10/compressed gas chamber 24.

First and second valves 16 and 18 can be replaced by duckbill valves or ball-spring valves or valves disclosed in co-pending commonly owned U.S. published Patent Application Nos. US2005/0022883 and US2006/0196562, international published Patent Applications WO 2006/050261 and WO 2006/088450, and U.S. Pat. No. 7,059,582. Fuel supply 10 or the device/fuel cell may also have valves that shut off the flow of fuel when the velocity, pressure or temperature of the fuel is too high, such as those disclosed in co-pending commonly owned U.S. published Patent Application No. US2006/0071088. All of these references are incorporated herein by reference in their entireties.

Also, outer casing 12 may also have a check valve or vent valve, which is capable of venting gas within outer casing 12 to the atmosphere or other locations when the pressure within outer casing 12 reaches a predetermined level.

It is intended that the present specification and examples be considered as exemplary only with a true scope and spirit of the invention being indicated by the following claims and equivalents thereof. Other embodiments of the present invention will be apparent to those skilled in the art from consideration of the present specification and practice of the present invention disclosed herein. Additionally, components or features of one embodiment can be utilized in other embodiments.

We claim:
1. A fuel supply system comprising
   a compressed gas chamber,
   a first valve comprising an inner center post and an outer center post concentrically disposed around the inner center post so as to leave a space between the inner center post and the outer center post, and a sealing member disposed in the space,
   a liquid fuel chamber,
   wherein a pressure regulator connects the compressed gas chamber to the liquid fuel chamber,
   wherein the pressure regulator is capable of taking a pressure input from the compressed gas chamber and providing a output pressure to the liquid fuel chamber to urge a liquid fuel out of the liquid fuel chamber and wherein the pressure input is higher than the output pressure, and wherein gas from the compressed gas chamber is transported through the first valve to the pressure regulator and back through the first valve to the liquid fuel chamber.

2. The fuel supply system of claim 1, wherein a first flow channel is defined between the inner center post and a valve body of the first valve, and a second flow channel is defined around the outer center post.

3. The fuel supply system of claim 2, wherein the first flow channel is an inner flow channel and the second flow channel is an outer flow channel.

4. A fuel supply system comprising
a compressed gas chamber,
a first valve comprising a first sealing member providing a first seal for a first flow channel and a second sealing member providing a second seal for a second flow channel, and
a liquid fuel chamber,
wherein a pressure regulator connects the compressed gas chamber to the liquid fuel chamber,
wherein the pressure regulator is capable of taking a pressure input from the compressed gas chamber and providing a output pressure to the liquid fuel chamber to urge a liquid fuel out of the liquid fuel chamber and wherein the pressure input is higher than the output pressure, and
wherein gas from the compressed gas chamber is transported through the first flow channel of the first valve to the pressure regulator and back through the second flow channel of the first valve to the liquid fuel chamber.

5. The fuel supply system of claim 4, wherein the pressure of the compressed gas chamber is capable of decreasing over time.

6. The fuel supply system of claim 4, wherein the liquid fuel comprises
a fuel that is directly consumable by a fuel cell or
a liquid fuel reactant that hydrolyzes with a metal hydride to form hydrogen.

7. The fuel supply system of claim 4, wherein the compressed gas chamber and liquid fuel chamber are connected to each other or are made integral to each other.

8. The fuel supply system of claim 4, wherein the compressed gas chamber is contained in a cartridge separated from the liquid fuel chamber.

9. The fuel supply system of claim 4, wherein the first valve further comprises an inner center post and a concentrically disposed outer center post.

10. The fuel supply system of claim 4, wherein a second valve connects the liquid fuel chamber to a fuel cell or a reaction chamber that hydrolyzes the liquid fuel.

11. The fuel supply system of claim 10,
wherein the second valve comprises a first and a second valve component,
wherein the first valve component comprises a valve body, at least one sealing member and a center post affixed to the valve body such that the center post is substantially immovable relative to the valve body,
wherein the at least one sealing member is positioned away from a mating surface of the first valve component and a space on the mating surface is provided around the center post,
wherein the space is sized and dimensioned to receive a hollow tube from the second valve component,
wherein, when the hollow tube is pushed into the first valve component, the hollow tube moves the at least one sealing member away from a sealing position to establish a flow path through both the first and second valve components.

12. The fuel supply system of claim 4, further comprising a fuel gage.

13. The fuel supply system of claim 12, wherein the fuel gage comprises a string connected to a fuel liner located within the fuel chamber.

14. The fuel supply system of claim 4, wherein the output pressure is a pressure less than or equal to about 5 psi.

15. The fuel supply system of claim 4, wherein the output pressure is a pressure less than or equal to about 3 psi.

16. The fuel supply system of claim 4, wherein the output pressure is a pressure less than or equal to about 2 psi.

17. The fuel supply system of claim 4, wherein the output pressure has a fluctuation of less than about ±2.0 psi.

18. The fuel supply system of claim 4, wherein the output pressure has a fluctuation of less than about ±1.5 psi.

19. The fuel supply system of claim 4, wherein the output pressure has a fluctuation of less than about ±1.0 psi.

20. The fuel supply system of claim 4, wherein the output pressure is substantially constant.

* * * * *